United States Patent
Banerjee et al.

(10) Patent No.: US 6,704,692 B1
(45) Date of Patent: Mar. 9, 2004

(54) METHOD AND SYSTEM FOR TRACKING MULTIPLE OBJECTS

(75) Inventors: Subhankar Banerjee, Bellevue, WA (US); Matthew Elden Berge, Woodinville, WA (US); Esmond Ernest DeVun, Jr., Issaquah, WA (US); Sharon Kay Filipowski, Kirkland, WA (US)

(73) Assignee: The Boeing Company, Seattle, WA (US)

( * ) Notice: Subject to any disclaimer, the term of this patent is extended or adjusted under 35 U.S.C. 154(b) by 62 days.

(21) Appl. No.: 09/696,473

(22) Filed: Oct. 25, 2000

Related U.S. Application Data

(60) Provisional application No. 60/161,402, filed on Oct. 25, 1999.

(51) Int. Cl.[7] .............................................. G01S 13/00
(52) U.S. Cl. ........................... 702/189; 702/42; 702/74; 702/81; 702/84; 702/116; 702/155; 342/96
(58) Field of Search ............................ 342/90, 91, 93, 342/94, 96, 102; 706/12, 14–20, 62; 707/2–6, 103, 104, 200–206; 700/100, 103, 173; 702/74, 81, 82, 84, 113, 42, 116–120, 122, 123, 142, 129, 135, 143, 149, 150, 152, 155, 158, FOR 103, FOR 113, FOR 123, FOR 135, FOR 137, FOR 141, FOR 144–145, FOR 151, FOR 157, FOR 160, FOR 170–171

(56) References Cited

U.S. PATENT DOCUMENTS

| | | |
|---|---|---|
| 5,406,289 A | 4/1995 | Barker et al. |
| 5,537,119 A | 7/1996 | Poore, Jr. |

(List continued on next page.)

OTHER PUBLICATIONS

H. Schramm and J. Zowe; *A Version of the Bundle Idea for Minimizing A Nonsmooth Function: Conceptual Idea, Convergence Analysis, Numerical Results*; SIAM J. Optimization; pp. 121–152 (1992); vol. 2, No. 1.

(List continued on next page.)

*Primary Examiner*—Marc S. Hoff
*Assistant Examiner*—Carol S Tsai
(74) *Attorney, Agent, or Firm*—Alston & Bird LLP

(57) ABSTRACT

An improved method and system for solving a combinatorial optimization problem, such as a tracking problem, to define a plurality of associations of measurements taken of a plurality of objects is provided. In one aspect, a method, a system and a computer program product are provided for constructing a plurality of updated tracks by solving a Lagrangian dual in which each of the measurement constraints has been relaxed. In another aspect, a hybrid branch and bound and LR technique is provided to select a plurality of updated tracks from among a plurality of candidate tracks having respective initial costs. In this regard, a search tree of the candidate tracks is ordered based upon the initial costs of the candidate tracks as adjusted by the dual variables that have been defined as a result of solving a Lagrangian dual. In order to attempt to increase the efficiency with which a Lagrangian dual is solved by nonsmooth optimization techniques, initial values for the dual variables and some of the subgradients are judiciously selected. The dual variables are initialized and some subgradients are provided based upon values of corresponding dual variables and some of the subgradients, respectively, that were determined during the solution of the prior problem. The method and system can be implemented in a parallel processing architecture that utilizes both coarse grain and fine grain techniques to evenly schedule a number of subproblems amongst a plurality of processors in order to obtain a solution in an efficient manner.

50 Claims, 7 Drawing Sheets

U.S. PATENT DOCUMENTS

| | | | | | |
|---|---|---|---|---|---|
| 5,598,355 | A | * | 1/1997 | Derou et al. | 342/159 |
| 5,715,165 | A | * | 2/1998 | Luh et al. | 700/100 |
| 5,886,908 | A | * | 3/1999 | Conn et al. | 703/2 |
| 5,959,574 | A | * | 9/1999 | Poore, Jr. | 342/96 |
| 6,266,655 | B1 | * | 7/2001 | Kalyan | 700/100 |
| 6,327,581 | B1 | * | 12/2001 | Platt | 706/12 |
| 6,374,227 | B1 | * | 4/2002 | Ye | 705/7 |
| 6,404,380 | B2 | * | 6/2002 | Poore, Jr. | 342/90 |
| 2002/0008657 | A1 | * | 1/2002 | Poore, Jr. | 342/96 |

OTHER PUBLICATIONS

R. Jonker and A. Volgenant; *A Shortest Augmenting Path Algorithm for Dense and Sparse Linear Assignment Problems*; Computing; pp. 325–340 (1987); vol. 38 Fasc. 4.

A.M. Frieze and J. Yadegar; *An Algorithm for Solving 3–Dimensional Assignment Problems with Application to Scheduling a Teaching Practice*; Journal of the Operational Research Society; pp. 989–995 (1981); vol. 32, No. 11.

P.J. Shea and A.B. Poore; *Computational Experiences with Hot Starts for a Moving Window Implementation of Track Maintenance*; SPIE, Signal and Data Processing of Small Targets, pp. 428–439 (1998); vol. 3373.

S. Blackman; *Multiple–Target Tracking with Radar Application; Chapter 6—Definitions of Track Life Stages (Track Initiation, Confirmation, Deletion, and Quality), Chapter 9—A Maximum Likelihood Expressions for Data Association*; pp. 151–178, 249–280.

S. Deb, M. Yeddanapudi, K. Pattipati and Y. Bar–Shalom; *A Generalized S–D Assignment Algorithm for Multisensor–Multitarget State Estimation*; IEEE Transactions on Aerospace and Electronic Systems 33; No. 2; pp. 523–536 (Apr. 1997).

K.C. Kiwiel; *Proximity Control In Bundle Methods For Convex Nondifferentiable Minimization*; Mathematical Programming 46; pp. 105–122 (1990).

C. Lemarechal; *Optimization: Chapter VII Nondifferential Optimization*; Handbooks in Operational Research and Management Science; pp. 529–572 (1989); vol. 1

A.B. Poore and N. Rijavec; *A Lagrangian Relaxtion Algorithm For MultiDimensional Assignment Problems Arising From Multitarget Tracking*; SIAM J. Optimization; pp. 544–563 (1993); vol. 3, No. 3.

R.L. Popp, K.R. Pattipati, Y. Bar–Shalom and R.A. Ammar; *Shared–Memory Parallelization of the Data Association Problem in Multitarget Tracking*; IEEE Transactions on Parallel and Distributed Systems; pp. 993–1005 (1997); vol. 8, No. 10.

L. Hong, W. Wang, M. Logan and T. Donohue; *Parallelization of a Multiple Model Multitarget Tracking Algorithm with Superlinear Speedups*; IEEE Transactions on Aerospace and Electronic Systems; pp. 281–290 (1997); vol. 33, No. 1.

R.A. Murphey, P.M. Pardalos and L. Pitsoulis; *A Greedy Randomized Adaptive Search Procedure for the Multitarget Multisensor Tracking Problem*; pp. 1–25.

Blackman, Samuel S., Definitions of Track Life Stages (Track Initiation, Confirmation, Deletion, and Quality, Multiple–Target Tracking with Radar Applications, 1986, pp. 151–175, Artech House, Inc., Norwood, Massachusetts, U.S.A..

Blackman, Samuel S., A Maximum Likelihood Expression for Data Association, Multiple–Target Tracking with Radar Applications, 1986, pp. 249–280, Artech House, Inc., Norwood, Massachusetts, U.S.A..

Beasley, John E., Lagrangean Relaxtion, Modern Heuristic Techniques for Combinatorial Problems, 1993, pp. 243–303, Blackwell Scientific Publications, Oxford.

Frangioni, Antonio, Solving Semidefinite Quadratic Problems Within NonSmooth Optimization Algorithms, Computers Ops Res., 1996, vol. 23, No. 11, pp. 1099–1118, Elsevier Science Ltd., Great Britain.

* cited by examiner

METHOD AND SYSTEM FOR TRACKING MULTIPLE OBJECTS

CROSS-REFERENCE TO RELATED APPLICATIONS

The present application claims priority from U.S. Provisional Application Ser. No. 60/161,402 filed Oct. 25, 1999 by Banerjee, et al. entitled Method and System for Tracking Multiple Objects, the contents of which are incorporated in their entirety herein.

FIELD OF THE INVENTION

The present invention relates generally to a method and system for solving a combinatorial optimization problem to select from a larger set, a plurality of associations of measurements taken of a plurality of objects and, more particularly, to a method and system for constructing a plurality of updated tracks based upon associations of a plurality of measurements of a plurality of objects.

BACKGROUND OF THE INVENTION

It is useful in many applications to track a plurality of objects. In addition to identifying the location of an object, various state variables, such as the velocity and acceleration of each object can be tracked. An analysis of the track of an object therefore permits the future path of the object to be predicted such that appropriate action can be taken. For example, in a commercial air traffic control application, a plurality of aircraft in the vicinity of an airport must be tracked in order to ensure that the respective courses of the aircraft are sufficiently spaced from one another. In addition, in military applications, enemy aircraft or missiles may be tracked to permit appropriate responses, such as interceptions, to be planned and executed.

In most aerospace applications, aircraft or other vehicles and missiles are tracked by radar that scans a region and obtains a number of sensor measurements based upon signals that have been returned from the object. While radar is prevalent, other types of interrogation systems can be utilized for tracking objects, including infrared systems or sonar systems for underwater tracking applications. Based upon the return signals or sensor measurements, the track of the object can be determined. In this regard, tracking is typically defined as the process of associating a sequence of measurements to define the track of a respective object.

In instances in which the region that is interrogated has only one object or has only a small number of objects that are widely spaced from one another, tracking of the object(s) is not difficult. However, in instances in which a plurality of objects are positioned in the same region, tracking becomes much more difficult. This difficulty in tracking is further exacerbated in instances in which the objects are closely spaced, highly maneuverable or have low observability since it will be difficult to determine which of the return signals or sensor measurements are attributable to which of the objects. Notwithstanding these difficulties, correctly associating measurements with respective objects is paramount to tracking applications since the integrity of the tracking process is otherwise compromised.

Most tracking systems that are currently deployed utilize data association techniques that extend a set of maintained tracks into a single additional scan of sensor measurements. In this regard, these deployed tracking systems maintain a track for each object based upon associations of prior sensor measurements with the respective object. Following each successive scan of the region, the additional sensor measurements are associated with a respective object and the track that has been maintained for that object is extended to include the additional sensor measurement. These tracking systems do not revisit the associations of sensor measurements that have been previously determined in order to generate the set of maintained tracks. As such, any errors that arise in defining the tracks will be maintained for a significant period of time since additional sensor measurements are merely tacked onto a maintained track in order to update or extend the track.

Typically, the extension of a set of maintained tracks into a single additional scan of sensor measurements is formulated and solved as either a bipartite two-dimensional assignment problem or by a greedy algorithm. For example, D. P. Bertsekas, *Linear Network Optimization—Algorithms and Codes*, The MIT Press, Cambridge, Mass. (1991), and R. Jonker and A. Volgenant, *A Shortest Augmenting Path Algorithm for Dense and Sparse Linear Assignment Problems*, Computing 38, pp. 325–340 (1987) describe the formulation and solution of a bipartite two-dimensional assignment problem, while S. S. Blackman, *Multiple Target Tracking with Radar Applications*, Artech House, Dedham, Mass., (1990) describes the formulation and solution of a greedy algorithm. Once the best set of associations of the maintained tracks with the single additional scan of sensor measurements has been determined, the tracks are updated and the process is repeated for the next scan of sensor measurements. This technique can provide real-time solutions for relatively easy tracking problems, but has been found to be inadequate in instances in which the objects are closely spaced, highly maneuverable and/or have low observability.

More recently, tracking systems have been investigated that update tracks based upon multiple scans of sensor measurements to improve tracking accuracy. As such, the sensor measurements that were associated to define the prior maintained track for a particular object can be revisited in the course of defining the updated track. While computationally more difficult, this multi-scan-tracking scheme is believed to be more accurate.

The multi-scan tracking technique is typically implemented in a sliding window tracking architecture as shown in FIG. 1. In this technique, a set of tracks for the objects is maintained based upon the prior S scans of sensor measurements. As such, the window is broad enough to include S scans of sensor measurements. Upon receiving a new scan, the window is slid such that the oldest of the S scans of sensor measurements falls out of the window and the new scan of sensor measurements is inserted into the window. See blocks 10 and 12. Thereafter, a number of potential associations of the maintained tracks and the S scans of sensor measurements within the window are determined and are termed candidate tracks. See block 14. In addition, a cost of each candidate track is determined. The cost is generally based on the likelihood that the measurements are actually part of the candidate track. In most instances, each cost is determined by a negative log likelihood function which includes terms to account for the deviation of the measurements from the candidate track, sensor errors, and events related to track initiation, track termination, track maneuver, false alarms and missed detections. See, for example A. Poore and N. Rijavec, *A Lagrangian Relaxation Algorithm for Multidimensional Assignment Problems Arising from Multitarget Tracking*, SIAM J. Optimization 3, No. 3, pp. 544–563 (August 1993), S. Deb, M. Yeddanapudi, K. Pattipati, and Y. Bar-Shalom, *A Generalized S-D Assignment*

*Algorithm for Multisensor-Multitarget State Estimation*, IEEE Transactions on Aerospace and Electronic Systems 33, No. 2, pp. 523–536 (April 1997), and Y. Bar-Shalom, ed., *Multitarget-Multisensor Tracking: Advanced Applications*, Artech House, Dedham, Mass. (1990) that discuss the generation of candidate tracks and the computation of costs for the candidate tracks.

After determining the set of candidate tracks and the cost of each candidate track, the most probable set of candidate tracks is determined by solving the resulting data association problem. See block 16. In particular, the data association problem is solved by selecting the subset of associations of minimum total cost while accounting for each maintained track and each sensor measurement. For S scans of measurements and a set of maintained tracks, this data association problem can be formulated as a multi-dimensional assignment problem (MAP) of dimensionality S+1. Once the data association problem is solved, the solution is utilized to extend the set of maintained tracks by the additional scan of sensor measurements. See block 18. The window then slides again to admit a new scan of sensor measurements while dropping the oldest scan and the generation of candidate tracks and respective costs as well as the solution of the data association problem are repeated.

By utilizing a sliding window technique, the sensor measurements gathered from multiple scans over time are fused and prior associations of sensor measurements can be revisited during the construction of the updated tracks. Unfortunately, for MAPs having a dimension larger than two, the data association problem is NP hard even though the typical applications for these tracking techniques, such as aerospace applications, require the MAPs to be solved in a manner sufficient to support real-time application.

Several techniques have been developed to solve, or approximately solve, the MAPs. For example, techniques based on a greedy randomized adaptive search procedure (GRASP) have been developed to solve MAPs. See R. A. Murphey, P. M. Pardalos, and L. Pitsoulis, *A Greedy Randomized Adaptive Search Procedure for the MultiTarget MultiSensor Tracking Problem*, DIMACS Series Vol. 40, American Mathematical Society, pp. 131–142 (1998), and A. J. Robertson, *Suboptimal Solution Approaches for the Multidimensional Assignment Problem*, INFORMS, Seattle, Wash. (Oct. 25–28, 1998). In addition, general N-dimensional formulations have been developed for solving MAPs as described by A. Poore and N. Rijavec, *A Lagrangian Relaxation Algorithm for Multidimensional Assignment Problems Arising from Multitarget Tracking*, SIAM J. Optimization 3, No. 3, pp. 544–563 (August 1993), S. Deb, M. Yeddanapudi, K. Pattipati, and Y. Bar-Shalom, *A Generalized S-D Assignment Algorithm for Multisensor-Multitarget State Estimation*, IEEE Transactions on Aerospace and Electronic Systems 33, No. 2, pp. 523–536 (April 1997), and U.S. Pat. No. 5,537,119 which issued Jul. 16, 1996 to Aubrey B. Poore, Jr., the contents of each of which are incorporated herein by reference.

As described by the Poore '119 patent, a branch and bound technique is employed to solve smaller MAPs, while a Lagrangian Relaxation (LR) technique is utilized to solve larger MAPs. As known to those skilled in the art, a branch and bound technique is a process wherein optimal solutions to combinational optimization problems are found by implicit enumeration. Typically, this is described as examination of the nodes of a search tree in which these nodes may ultimately be viewed as representing feasible, partial (or complete) solutions to the problems. In this application, a depth first search (from left to right) of a search tree is conducted in which each node of the tree may (first) be viewed as a candidate track created by a respective association of a plurality of measurements. In this regard, measurements includes both the sensor measurements and the maintained tracks. As used generically hereinafter, measurements shall therefore refer to the combination of sensor measurements and maintained tracks. In addition, consider, throughout, that these candidate tracks (or simply "tracks") will be arranged in some given order, for example, by increasing cost per non-zero measurement. Furthermore, the set of children nodes (at level 1+1) descending from some particular parent node (at level 1) will always be arranged in an order from left to right consistent with the order given for the tracks which they represent. Also, the first (left-most) node descending from a parent node will always represent a track appearing later in the ordering of tracks than the track representing the parent node. The first level of the search tree includes a node for each track. The nodes in this first level descend from a root node at the zero level. This root node is the only node not representing any particular track. For each node, (track A) in the first level, a descending node (track B) is included if track B occurs after A in the given ordering and if track B is feasible with respect to track A. In order to be feasible with respect to track A, track B must only include measurements that are different from those included in track A. The search tree includes additional lower levels defined in a similar manner, a difference being that a track B (at level 1+1) may descend from track A (at level 1) if B is feasible with respect to all of the tracks lying in the unique path (branch) from B to the root node. Again, track B must also appear later than track A in the given ordering of tracks. Thus, a node may (alternatively) be viewed as representing the set of jointly feasible tracks contained in this unique path to the root node in the tree. If this set of tracks completely accounts for every measurement, the set of tracks represents a completely feasible solution. Otherwise, the set of tracks is a partially feasible solution. The various branches (or, equivalently, nodes) of the search tree are then examined by depth first search (from left to right) to determine the set of candidate tracks that include each measurement once and that also has the lowest cumulative cost. While useful for smaller MAPs, this branch and bound technique without extension or modification, is not generally useful for larger MAPs. As such, the Poore '119 patent also describes an LR technique for solving the larger MAPs.

In a prior use of LR, each of the sensor measurements as well as each of the maintained tracks is subject to a constraint. In this regard, the constraints limit each maintained track and sensor measurement to a single updated track such that no maintained track or sensor measurement can form part of two or more updated tracks. In order to find a solution of the MAP in a real-time manner, the LR technique described by the Poore '119 patent relaxes all but two of the sets of constraints. The two-dimensional problem that remains following the relaxation of all but two of the sets of constraints is then solved and the solution of the two-dimensional problem is utilized to construct a solution of the original problem. The LR technique described by the Poore '119 patent thereafter recursively solves for the higher order problems based upon the solution of a lower order problem until a solution for the original N-dimensional problem is reached. While the LR technique described by the Poore '119 patent determines the solution of the MAP in order to associate the measurements in a manner that minimizes the cost of the resulting associations and therefore defines the updated tracks of the objects, it would be advantageous to improve upon conventional LR techniques to enable real-time solution of a larger set of problems,

SUMMARY OF THE INVENTION

An improved method and system for solving a combinatorial optimization problem to define a plurality of associations of measurements taken of a plurality of objects is therefore provided. More particularly, an improved method and system are provided for constructing a plurality of updated tracks based upon associations of a plurality of measurements of a plurality of objects, even in instances in which the sensor measurements are asynchronous. As a result, the tracking method and system of the present invention permits relatively large combinatorial optimization problems, such as those that occur in sophisticated tracking applications, to be efficiently solved in a real-time fashion. As such, the tracking method and system of the present invention should be useful for a variety of commercial and military applications, including aerospace applications and the like.

According to one aspect of the present invention, a method, a system and a computer program product are provided for constructing a plurality of updated tracks based upon associations of a plurality of measurements, each of which is subject to a plurality of constraints. According to this aspect, each of the constraints are relaxed by providing a dual variable for each constraint. A Lagrangian dual function is then constructed that at least partially depends upon the dual variable for each constraint and a cost associated with each potential association, i.e., each candidate track. The solution of a Lagrangian dual problem is then determined, such as by maximizing the Lagrangian dual function. In the course of solving the Lagrangian dual problem, a value for each dual variable is also determined. The associations of the measurements that define the plurality of updated tracks are then determined based at least in part upon the values the dual variables associated with each constraint. By relaxing each of the constraints, however, the method and system of this aspect of the present invention permit the combinatorial optimization problem to be more easily solved by LR techniques than conventional LR techniques that require at least two of the constraints to remain fixed.

Typically, the solution of the Lagrangian dual problem, such as the maximization of the Lagrangian dual function, is evaluated prior to determining the associations of the measurements that define the plurality of updated tracks. In order to solve the Lagrangian dual problem, the dual variable for each constraint is typically set to an initial value which is then updated until an acceptable solution is determined. The optimal values for the dual variables can then be utilized during a subsequent iteration in order to attempt to find the solution of the Lagrangian dual problem in a more efficient manner.

A method and computer program product are also provided according to another aspect of the present invention that employ a hybrid branch and bound and LR technique to select a plurality of updated tracks from among a plurality of candidate tracks having respective initial costs. In this regard, the candidate tracks are based upon associations of a plurality of measurements having respective dual variables that have been defined, typically either as a result of solving a Lagrangian dual function or being set to a predefined value, such as zero. According to this aspect of the present invention, an adjusted cost and an adjusted cost per non-zero measurement are determined for each candidate track based upon the initial cost and the dual variable for each measurement that is associated to create the candidate track. The candidate tracks are then placed in order based upon the adjusted cost per non-zero measurement, such as in increasing order of adjusted cost per non-zero measurement. A search tree having a plurality of levels is then searched by a depth first search. In this regard, at least a portion of a level 1+1 is examined with level 1+1 being dependent upon a level 1. Level 1+1 includes candidate tracks that are each: (1) feasible with respect to all candidate tracks lying in the unique path from the respective candidate track to a root node, and (2) later in the order of adjusted cost per non-zero measurement in which the candidate tracks have been placed than the candidate track of level 1 from which the respective candidate track descends. In addition, the examination of the candidate tracks at level 1+1 involves the examination of the candidate tracks at level 1+1 that descend from a respective candidate track of level 1 in the order in which the candidate tracks have been placed. Additional levels defined in a similar manner may also be examined as needed with the maximum number of levels being one more than the number of measurements and the minimum number of levels being two. As such, at least portions of the search tree can be efficiently searched to identify the updated tracks.

In searching the search tree according to a depth first search, at least a portion of the search tree is sequentially searched along a unique path from a root node to a candidate track of level 1 of the search tree. According to most search strategies, feasible candidate tracks may be skipped since the first feasible candidate track from each level need not be automatically selected. According to one embodiment of the invention, however, a running total of the number of feasible candidate tracks that are skipped during the sequential search along the unique path can be tabulated and the search along the unique path can be terminated if the total number of feasible candidate tracks that are skipped exceeds a threshold value, thereby effectively limiting or controlling the number of skips. As such, the time required to search the search tree and the requisite computing resources can be reduced by appropriately terminating the search of a branch once an excessive number of feasible candidate tracks have been skipped. Computing time can also be reduced by limiting the total number of nodes examined explicitly.

In one advantageous embodiment, a count of the lowest cumulative adjusted cost of the completely feasible sets of candidate tracks identified during the sequential search of the nodes of the search tree can be maintained. The search of a respective branch can then be terminated by a bounding argument if the sum of the cumulative adjusted cost of the current, partially feasible set of candidate tracks and the lowest estimate of the cumulative adjusted cost associated with the measurements that remain unused is at least as great as the count of the lowest cumulative adjusted cost. Accordingly, the efficiency with which the search of the search tree is conducted can be further improved by terminating the search of a branch that will not produce a set of updated tracks having a lower cumulative adjusted cost.

The application of an improved method and computer program product for solving the Lagrangian dual problem of a MAP by nonsmooth reoptimization techniques is also provided according to another aspect of the present invention which judiciously utilizes initial values for the dual variables and provides some subgradients in order to try to permit the Lagrangian dual function to be solved in a more efficient manner. According to this aspect of the present invention, the dual variables are initialized and some subgradients are provided based upon values of corresponding dual variables and some of the subgradients, respectively, determined during the solution of the prior problem, i.e., during the prior construction of the plurality of maintained tracks.

By initializing the dual variables and providing some of the subgradients based upon values of the dual variables and some of the subgradients determined during the solution of a prior problem, the method and computer program product of this aspect of the present invention take advantage of the close relationship between the combinatorial optimization problems presented in a sliding window architecture or the like. As such, the method and computer programs product of this aspect of the present invention attempt to arrive at an acceptable solution of the Lagrangian dual problem in a more efficient manner than conventional techniques.

A method and a computer program product for constructing a plurality of updated tracks based upon associations of a plurality of sensor measurements and a plurality of maintained tracks that take advantage of the efficiencies provided by a parallel computing architecture having a plurality of processors are also provided. According to this aspect of the present invention, data representative of the plurality of sensor measurements and the plurality of maintained tracks is decomposed into a plurality of subproblems having respective sizes. Typically, the sizes of the subproblems are based upon at least one of the number of associations and the number of measurements included within the subproblem. The sizes of the subproblems are then evaluated to determine if the subproblems are capable of being assigned to a plurality of processors in a balanced manner. In this regard, the maximum variation between the cumulative size of the subproblems that can be assigned to the processors can be determined. As such, the subproblems are generally considered to be capable of being assigned to the plurality of processors in a balanced manner if the maximum variation is less than a predetermined threshold. If the maximum variation exceeds the predetermined threshold, however, the subproblems are considered incapable of being assigned to the plurality of processors in a balanced manner.

Based upon the evaluation of the sizes of the subproblems, the plurality of subproblems are assigned to respective ones of the processors. The plurality of subproblems are then executed in parallel in the respective processors to determine the appropriate associations of the plurality of sensor measurements and the plurality of maintained tracks of each subproblem in order to define the plurality of updated tracks. If the evaluation of the sizes of the subproblems determines that subproblems are incapable of being assigned to the plurality of processors in a balanced manner, at least one of the subproblems, i.e., typically the largest subproblem, can be divided into parts and assigned to different processors in order to further balance the workload of the respective processors.

Typically, the execution of the plurality of subproblems involves the construction of the Lagrangian dual function representative of the respective subproblem and the maximization of the Lagrangian dual problem. Since each potential association has an initial cost, the construction of the Lagrangian dual function preferably determines an adjusted cost for each potential association based upon the initial cost and the dual variable for each measurement that is associated to create the potential association. In order to further balance the workload of the respective processors, the determination of the adjusted costs can be assigned to a different processor so as to be performed in parallel with the execution of other parts of the same subproblem. By appropriately balancing the workload amongst the plurality of processors, the method and computer program product of this aspect of the present invention can construct the plurality of updated tracks in an efficient manner and with an efficient use of the computing resources.

DETAILED DESCRIPTION OF THE INVENTION

Figure 1:
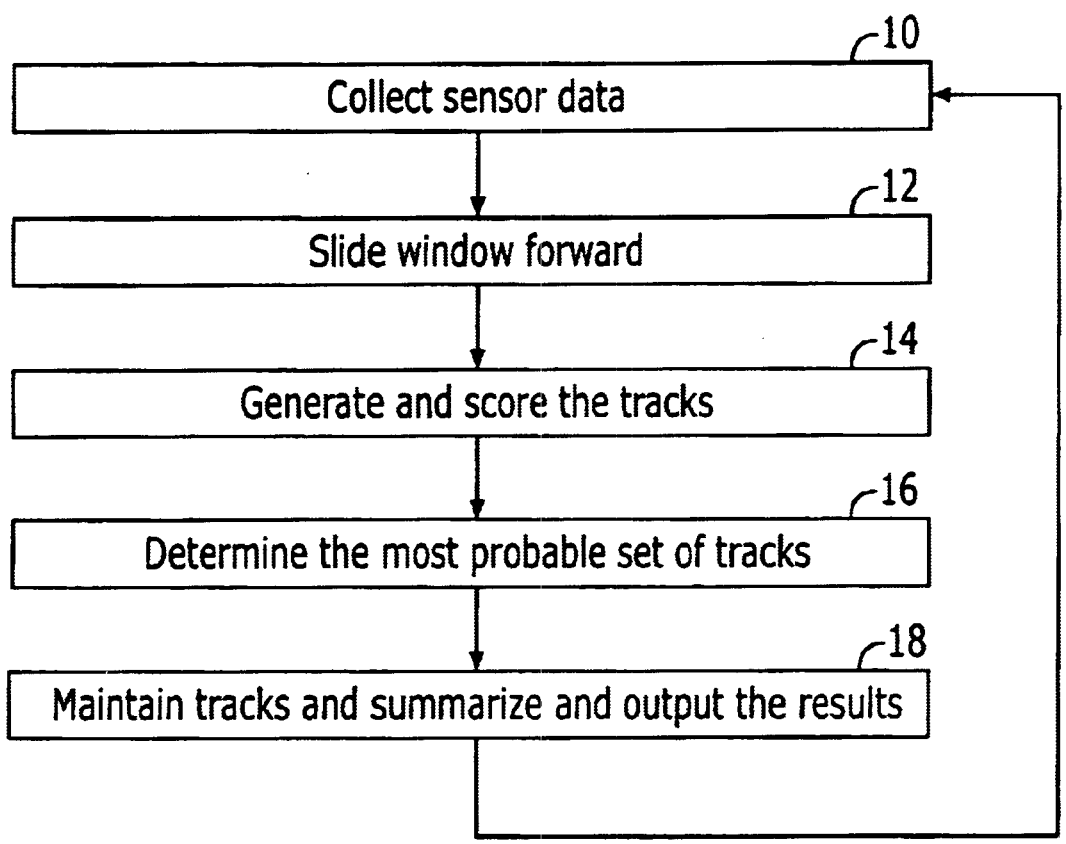
FIG. 1 is a flow chart illustrating a sliding window tracking technique.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention provides a method, system and computer program product for solving a combinatorial optimization problem to select, from a larger set, a plurality of associations of measurements taken of a plurality of objects. Most commonly, the method, system and computer program product of the present invention are employed in tracking applications, such as tracking airplanes, missiles or other vehicles for both commercial and military applications. As such, the method, system and computer program product of the present invention will be hereinafter described in conjunction with a tracking application, although the method, system and computer program product can more generally be applied to other types of combinatorial optimization problems, such as crew scheduling problems or the like.

The combinatorial optimization problem is most commonly defined as a multi-dimensional assignment problem (MAP). However, the method, system and computer program product of the present invention can be applied more generically to set partitioning problems (SPTs) and set packing problems (SPKs). As such, the relationship between MAPs, SPTs and SPKs is hereinafter described.

In order to determine the mathematical formulation of a MAP, consider the situation in which a set of $N_0$ maintained tracks is to be associated with S scans of sensor data where scan $_i$ contains $N_i$ sensor measurements. As described above, the maintained tracks and the sensor measurements are hereinafter collectively termed measurements. Also consider the corresponding "measurement" index sets $T_0, M_1, \ldots, M_S$ containing $N_0+1, N_1+1, \ldots,$ and $N_S+1$ elements, respectively. The additional element in each set refers to a "0th" index and will be described below. These sets are summarized as follows:

$$T_0 = \{0, 1, \ldots i_0 \ldots, N_0\},$$
$$M_1 = \{0, 1, \ldots i_1 \ldots, N_1\},$$
$$\vdots$$
$$M_S = \{0, 1, \ldots, i_S \ldots, N_S\}.$$

Furthermore, there is a set of associations, each of which is an (S+1)-tuple defined in terms of these index sets. Each association also has a corresponding cost. For example, when S=2, then association (3,2,5) asserts that the object associated with track 3 generates measurement 2 from the first scan and measurement 5 from the second scan. In addition, the 0th-index enables the representation of false alarms and missed detections. For example, (0,0,2) asserts that measurement 2 from the second scan is false while (2,0,4) asserts that the object associated with track 2 generated measurement 4 from the second scan but experienced a missed detection on the first scan. Although the MAPs will typically be sparse problems, the problems are formulated to include the complete set of false alarm associations. In this context, an association such as (3,0,0) will be termed a false alarm, even though in a tracking application this association might be termed a track termination association.

In solving the MAP, the objective is to select a set of associations of minimum total cost subject to the constraint that each nonzero index in each set is used exactly once. However, the 0th-index may be used any number of times. In this regard, it is noted that the complete set of false alarms forms a feasible solution to the problem. Thus, the assumption that the problem contains these false alarms guarantees feasibility. A mathematical programming formulation for the sparse version of this S+1 dimensional MAP is set forth below:

Equation Set 1

Association set $H \subseteq T_0 \times M_1 \times \ldots \times M_S$

Define $H(j,k) = \{(i_0, i_1, \ldots i_j, \ldots, i_s) \in H \mid i_j = k\}$

Minimize: $\sum_H c_{t_0 t_1 \ldots t_s} \cdot x_{t_0 t_1 \ldots t_s}$

Subject to:

$$\sum_{H(0,k_0)} x_{t_0 t_1, t_s} = 1 \quad k_0 = 1, 2, \ldots N_0$$

$$\sum_{H(1,k_1)} x_{t_0 t_1, t_s} = 1 \quad k_1 = 1, 2, \ldots N_1$$

$$\vdots$$

$$\sum_{H(S,k_S)} x_{t_0 t_1, t_s} = 1 \quad k_S = 1, 2, \ldots N_S$$

$$x_{t_0 t_1, t_s} \in \{0, 1\}$$

With respect to equation set 1, an association of the set H of the form $(i_0, i_1, \ldots i_s)$ would have a corresponding cost of $C_{i_0 i_1 \ldots i_s}$ and an associated binary decision variable $X_{i_0 i_1 \ldots i_s}$.

Each instance of the above MAP is also more generally described as an instance of an SPT, as described by G. L. Nemhauser and L. A. Wolsey, *Integer and Combinatorial Optimization*, John Wiley & Sons, Inc., New York, N.Y. (1988). By way of background, set partitioning involves an M×N matrix A of 0/1 elements. The M rows represent elements in a ground set, while the N columns represent subsets on the ground set, that is, a column j represents the subset containing the elements i for which $a_{ij}=1$. Each subset is assigned a cost and the objective is to pick subsets of minimum total cost, subject to a constraint of using each element in the ground set exactly once. The mathematical programming formulation of this SPT is set forth below:

Equation Set 2

Minimize $\sum_{j=1}^{N} c_j \cdot x_j$

Subject to:

$$\sum_{j=1}^{N} a_{ij} \cdot x_j = 1 \quad \forall i$$

$$x_j \in \{0, 1\}$$

The matrix A=(aij) is an association matrix having rows representative of measurements and columns representative of candidate or potential tracks or associations. C=(cj) is the vector of association costs and x=(xj) is the vector of binary decision variables wherein xj=1 indicates the selection of track j whereas xj=0 indicates that track j was not selected. A MAP instance translates to an SPT instance by interpreting the ground set to be the pooled set of measurements across all scans and the subsets to be the associations. The false alarm associations described above translate to singleton subsets. Thus, any algorithm for solving SPTs can be used to solve corresponding MAPs. As such, the method and system of the present invention is sufficiently general to solve any SPT containing all singleton subsets since any MAP with zero indices and containing all false alarms can be translated into an SPT containing all singleton subsets. For convenience, future references to SPTs will assume that the SPTs contain all singleton subsets. Similarly, future references to MAPs will assume that the zero index is permitted and that the MAP contains all false alarm associations.

Conversely, an SPT can be translated to a MAP by partitioning the ground set into D groups so that each subset possesses no more than one element from each group. When such a partition is identified, the SPT can be cast immediately as a MAP of dimension D. It is noted that every SPT can be cast as a MAP of dimension M by simply partitioning the ground set into the singleton groups. Of course, this is not very useful since M may be a very large number. As such, the problem of interest is to identify a D-partition of the rows of A so that each subset possesses no more than one element from each group and so that D has a minimum value. Unfortunately, this problem is a difficult problem in graph coloring. Accordingly, while every SPT can be recast as a MAP, it may not be practical to do so since the resultant dimension may be extremely large. Since the method and system of the present invention solves, either approximately or exactly, instances of an SPT without translating them to potentially higher dimensional MAP instances, the method and system of the present invention is more broadly applicable. For example, problems arising in asynchronous tracking may be more readily formulated as an SPT than a MAP of small dimension.

Another transformation of interest begins with an SPT and makes use of the special assumption of the existence of all singleton subsets (false alarms). Without loss of generality, it can be assumed that for each sensor measurement and maintained track, there is exactly one false alarm association since if there were more than one false alarm association, the one false alarm association of minimum cost could be maintained and the others could be discarded. For purposes of explanation, the "measurement cost" is defined to be the cost of a measurement's unique false alarm association. For every association, its cost can be modified by subtracting from its original cost, the measurement cost for every measurement in the association. The new problem will have the same set of optimal solutions, since every measurement is constrained to be used exactly once. However, the optimal objective will differ by the sum of all measurement costs. Additionally, the new problem will have zero cost for all false alarm associations. Thus, the false alarm associations may be eliminated from the problem by modifying the constraint of "using each measurement exactly once" to "using each measurement at most once". Correspondingly, the SPT becomes a problem without false alarms, but with inequality (i.e., less than or equal to) constraints. This type of problem is known as an SPK as described by G. L. Nemhauser and L. A. Wolsey, Integer and Combinatorial Optimization, John Wiley & Sons, Inc., New York, N.Y. (1988). Thus, each instance of an SPT with a complete set of false alarms can be transformed into an instance of an SPK.

Conversely, it can also be established that every SPK can be transformed into an SPT with a complete set of false alarms. This transformation is accomplished by augmenting the association with a complete set of zero-cost false alarms. In this case, inequality can then be changed to equality and the corresponding problem is an SPT.

The transformations described above establish that the following problem classes are equivalent: MAPs—Multidimensional Assignment Problems (with 0th-indices and containing all false alarms), SPTs—Set Partitioning Problems (containing all singleton subsets), and SPK—Set Packing Problems. As such, any instance from any of the three classes can be translated and then approximately or exactly solved by the method and system of the present invention. By solving SPT and SPK formulations without requiring the "scans" or "index set" partitioning inherent in a MAP, the method and system of the present invention provides a significant advantage. In particular, the method and system of the present invention can efficiently solve a broader class of problems, including problems involving the asynchronous tracking of multiple targets with multiple sensors in which the measurement data may not be partitioned into scans.

With reference to the sliding window architecture depicted in FIG. 1, the method and system of the present invention describes an improved data association technique (block 16) that approximately solves the problem aimed at identifying the most probable set of associations or tracks. As such, the method and system of the present invention are provided with a plurality of candidate tracks, each of which represents a potential association of a plurality of measurements. The candidate tracks can be determined in various conventional fashions involving utilization of fine and coarse gating techniques. As described above, an association matrix A typically defines the plurality of candidate tracks and is presented to the method and system of the present invention for further analysis.

Figure 3A:
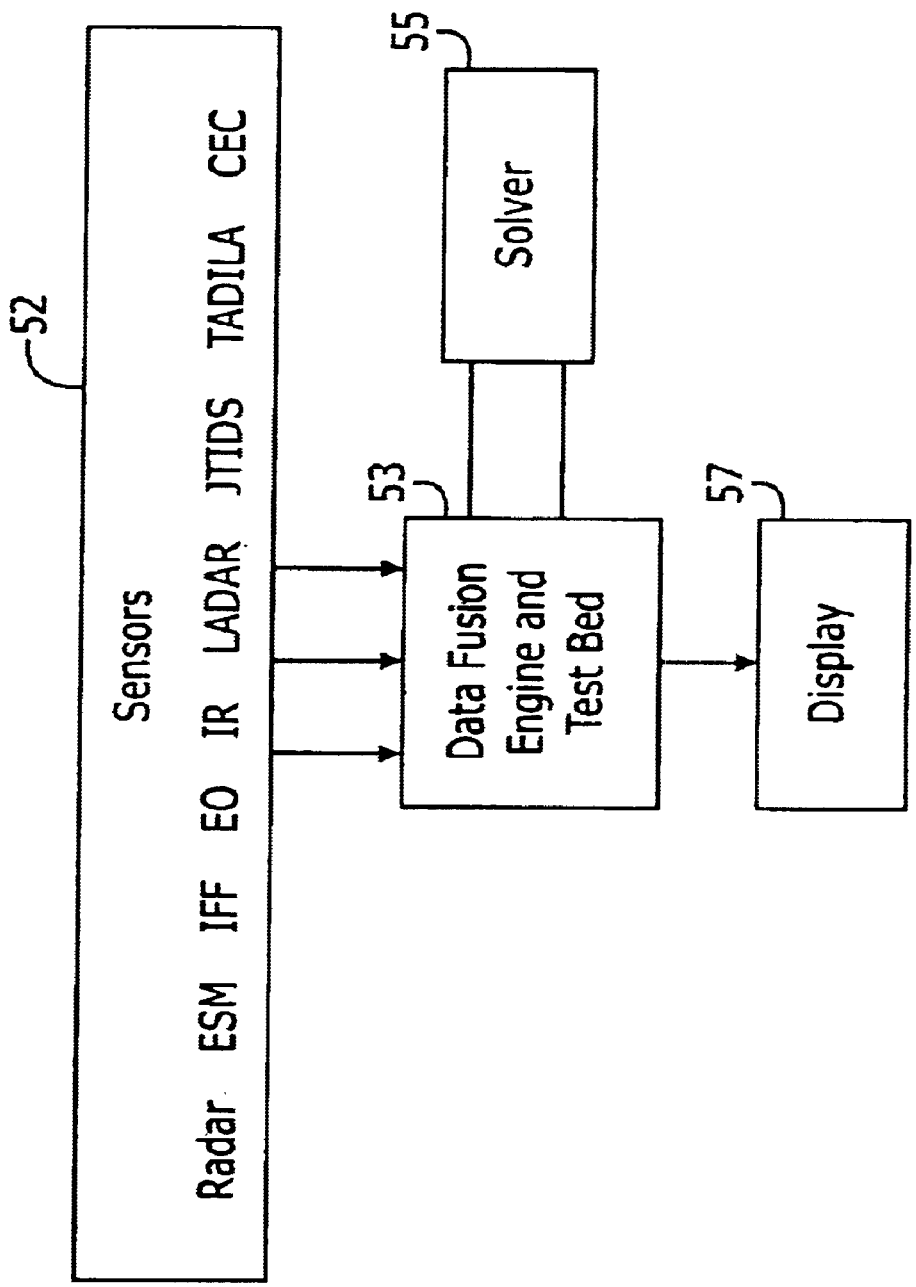
FIG. 3A is a block diagram of a system that includes a plurality of sensors, a data fusion engine and test bed and a solver according to one embodiment of the present invention.

As shown in FIG. 3A, the sensor measurements can be obtained, and possibly arrive asynchronously, from various types of sensors 52 or other instruments, including radar, sonar, infrared sensors, electronic support measures (ESM), identification friend or foe (IFF), electro-optic sensors (EO), laser detection and ranging (LADAR), joint tactical information distribution system (JTIDS), tactical automated digital information link, implementation A (TADIL A), combined engagement capability (CEC) and the like. In one advantageous embodiment, the sensor measurements are obtained by a data fusion engine and test bed 53 that can be utilized in a simulation environment to support trade studies and to aid in the design and evaluation of various tracker systems. One advantageous data fusion engine and test bed that is currently under development by The Boeing Company of Seattle, Wash. is termed the fast efficient real-time multi-source assignment tracker (FERMAT). The data fusion engine and test bed can be designed to receive any number of sensor measurements, such as 2000 in one instance. In addition, the sensor measurements can relate to a wide variety of state vectors. In this regard, state vectors of interest in tracking can be grouped into two categories: the observation state vectors, which depend upon the type of sensor, and the estimated target state vector. The data fusion engine and test bed can be designed to handle all sensor observation data, both of a kinematic nature and non-kinematic nature. Examples of these are range, azimuth angle, elevation angle, and their first and second derivatives; local and Earth centered coordinates of x, y z and their first and second derivatives; observation times and times associated with specific events such as booster launch and booster burnout; and identification data such as tail number, IFF code, and measured spectral data for several phenomenologies. In addition to the observation state vectors, the data fusion engine and test bed will also be designed to handle estimated target state vectors. The estimated state vector, which varies with the situation, includes kinematic components of: position, velocity, acceleration, and jerk (third derivative of position) in Earth centered inertial coordinates; range azimuth, elevation and their first, second and third derivatives measured in the sensors local coordinate system; and specific epochs of critical target events. The estimated non-kinematic elements of the target state vector include the non-kinematic elements described above as well as specific target type and sub-type.

In addition to the association matrix A, a cost vector c is also provided that identifies the relative costs of each candidate track. The cost of a candidate track can be computed in a variety of manners known to those skilled in the art, but is typically determined by a negative log likelihood function.

The data fusion engine and test bed 53 generally implements the sliding window architecture of FIG. 1 in that the data fusion engine and test bed can determine the set of candidate tracks and their associated cost. The data fusion engine and test bed can then call the solver 55 of the present invention to solve the combinatorial optimization problem and return a selected set of tracks. These tracks can then be stored in memory, displayed upon display 57 or otherwise further processed by the data fusion engine and test bed.

Figure 2A:
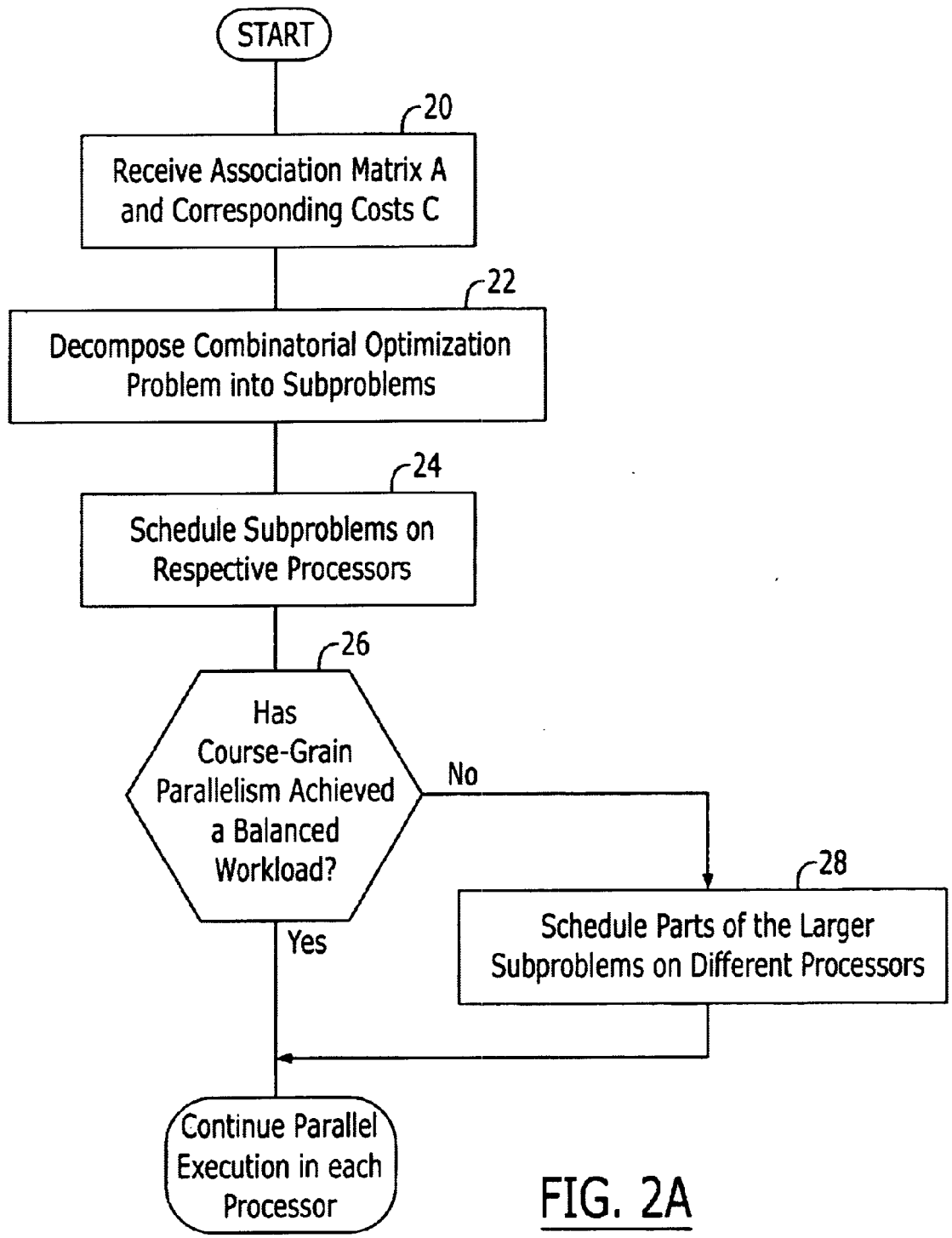
FIGS. 2A and 2B are flow charts illustrating operations performed by the method, system and computer program product of one advantageous embodiment of the present invention.
Figure 2B:
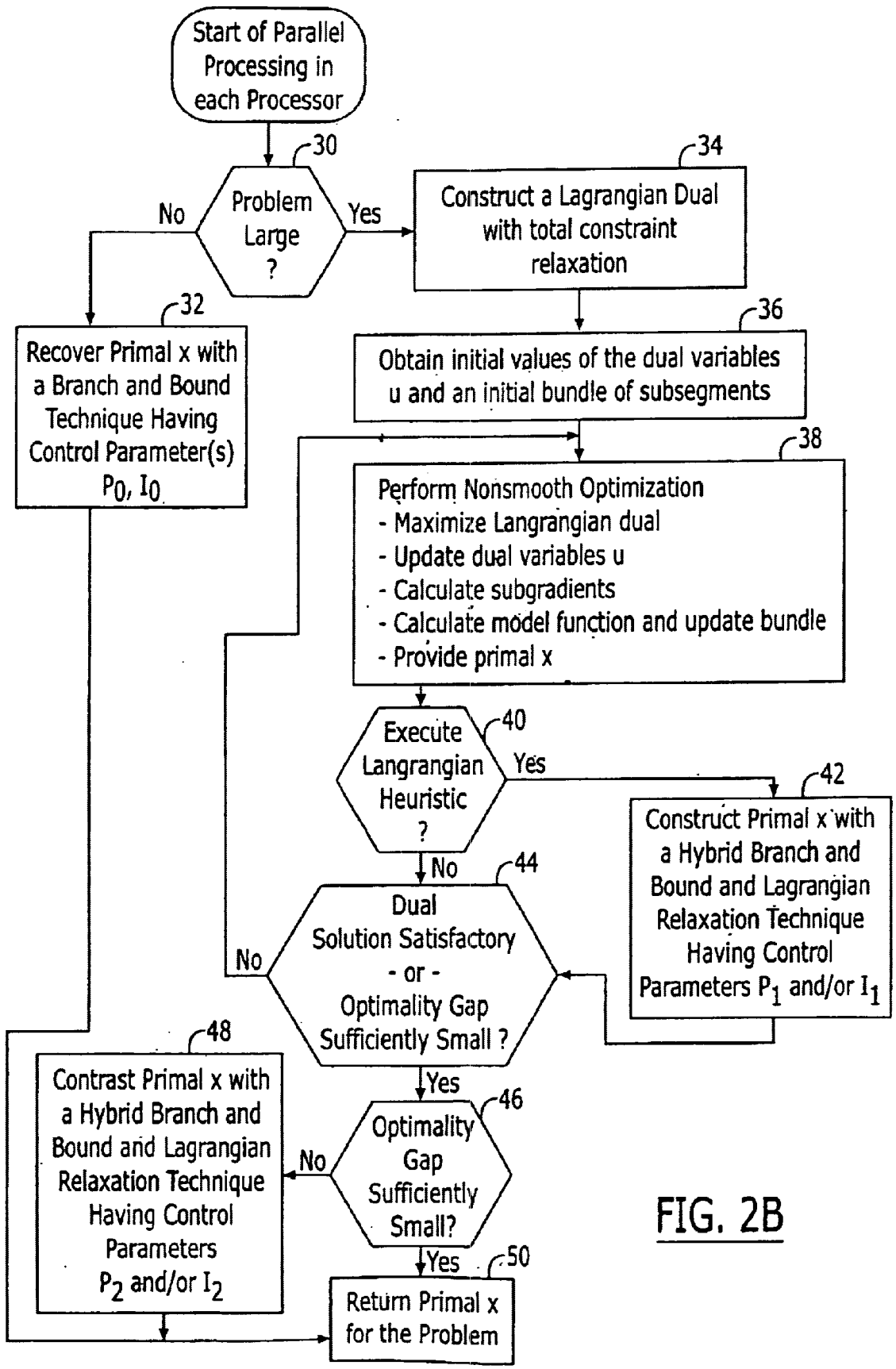

With reference now to FIGS. 2A and 2B which illustrate the operations performed by the method, system and computer program product of one advantageous embodiment of the present invention, a combinatorial optimization problem of S+1 dimensions is initially analyzed to determine if the problem can be decomposed into independent subproblems. See blocks 20 and 22. While the combinatorial optimization problem will primarily be described as a MAP for purposes of explanation, the combinatorial optimization problem can be a MAP, SPT or SPK without departing from the spirit and scope of the present invention.

The ability to decompose a MAP may be caused, for example, by spatial separation between clusters of objects and can be detected by graph theoretic methods. In this regard, detection and identification of the clusters of objects are accomplished by constructing a graph, as described below, and then using depth-first or breadth-first search techniques to find the connected components. See, for example, A. Aho, J. Hopcroft, and J. Ullman, Data Structures and Algorithms, Addison-Wesley, Reading, Mass. (1983), A. Poore and N. Rijavec, A Lagrangian Relaxation Algorithm for Multidimensional Assignment Problems Arising from is Multitarget Tracking, SIAM J. Optimization 3, No. 3, pp. 544–563 (August 1993), and the Poore '119 patent. The graph contains a node for every maintained track and sensor measurement and an edge between every two nodes that are linked by at least one association, that is, at least one association contains the respective sensor measurements and/or maintained track that are linked. If the MAP is decomposable, the problems induced by the connected components of this graph do not interact and may be solved independently. Although decomposition is not productive for dense MAPs, many real-world tracking problems are sufficiently sparse and give rise to highly decomposable problems. An alternate and possibly advantageous approach for finding these connected components, besides a depth-first or breadth-first search, may be based upon a modification or simplification of the Kruskal algorithm for finding minimum spanning trees. The Kruskal minimum spanning algorithm is described in R. Ahuja, T. Magnanti, and J. Orlin, Network Flows—Theory, Algorithms, and Applications, Prentice Hall (1993). A simplification of this algorithm enables the finding of connected components based on the problem description given and without the creation of additional data structures.

By decomposing a MAP, a "divide-and-conquer" approach can then be employed, i.e., many small problems may be solved more efficiently than one large one and a parallel processing architecture can be utilized to more efficiently solve the subproblems, as described below. In conjunction with the divide-and-conquer approach, individual subproblems may be targeted for solution by different methods depending on their characteristics. Small problems, for example, can usually be solved quickly and exactly by branch-and-bound techniques (see block 32), while larger problems may require more sophisticated approximation techniques, such as Lagrangian Relaxation (LR) techniques (see blocks 34–48).

Figure 3B:
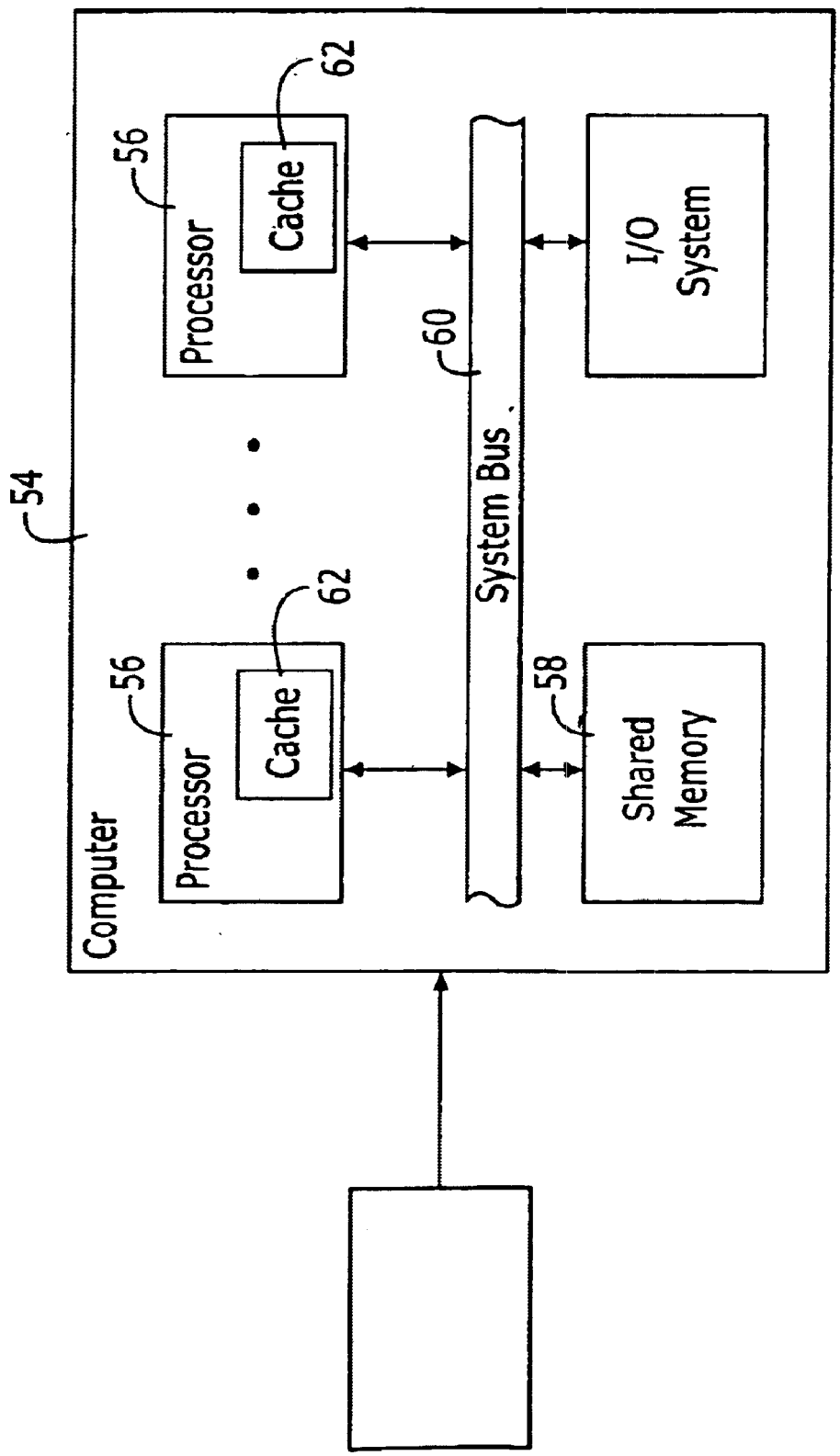
FIG. 3B is a hardware block diagram of a system having a parallel processing architecture according to the embodiment of the present invention.

As a result of decomposing the MAP, a set of MAP subproblems is created of unpredictable number and size. In instances in which the decomposition is productive and two or more subproblems are identified, the method and system of one aspect of the present invention preferably solves the subproblems concurrently on a computer having a parallel processing architecture. As shown in FIG. 3B, the solver 55 preferably includes a computer 54 having a plurality of processors 56 and associated memory 58. For example, the computer can have multiprocessor shared-memory, distributed-shared memory, or even fully distributed memory. In the illustrated embodiment, the computer includes shared memory which all processors access through a common bus or other interconnection network 60. However, in distributed-shared memory architectures, the physical memory is split across processors, even though the processors can still access the entire memory as if there was one memory. In this regard, although there is one global address space, data has to be moved to the processor where the problem is being solved to achieve high performance. In dynamic scheduling discussed below, the data movement happens one subproblem at a time. In the static case, however, all or at least groups of subproblem data can be moved at once, thereby reducing significant system overhead. Typically, distributed-shared memory machines scale to a greater number of processors than shared memory machines. Thus, systems designed to solve larger combinatorial optimization problems in real-time may prefer to utilize a distributed-shared memory structure.

As also depicted in FIG. 3B, the processors 56 can also include cache memory 62. Most modem architectures are based on what is called memory hierarchy. In this regard, the processor first looks for the data in the cache, and if it does not find the data in cache then the processor goes to memory 58. Accessing memory is an order of magnitude more expensive than accessing cache. Therefore, if the original problem can be broken into subproblems that can be assigned to different processors and stored in cache memory, either entirely or at least partially, significant performance improvement can be obtained.

Since the subproblems may be of widely varying size, the method and system of the present invention preferably schedule or assign the subproblems to the processors in a manner that balances the load across the processors, i.e., the work is distributed as evenly as possible to achieve high scalability. See block 24. This technique of assigning the subproblems to a plurality of parallel processors is termed coarse-grain parallelism. The subproblems can be assigned to the plurality of processors according to either a dynamic or a static scheduling policy. The static scheduling of subproblems to processors means that an analysis of the subproblems' size distribution is performed and subproblems are assigned to the processors to approximately balance the load across processors. On the other hand, the dynamic scheduling of subproblems to processors means that no analysis of the subproblems' sizes is done to assign subproblems to processors; rather, subproblems are assigned to the processors on the fly. As described below, the method and system of this aspect of the present invention uses both dynamic and static load balancing policies.

Dynamic scheduling can be performed in different manners. One approach can be that for every subproblem, a thread is created which then gets executed on some processor. See B. Nichols, D. Buttlar and J. P. Farrell, Pthreads Programming, O'Reilly & Associates (1996). Although this approach is a simple model to implement, it can incur significant system overhead. Another approach is to create a pool of fixed number of threads and a shared work pool. Each thread from the thread pool selects a subproblem from the work pool, executes it and the process is repeated until the work pool is empty. See B. Nichols, D. Buttlar and J. P. Farrel, Pthreads Programming, O'Reilly & Associates (1996). The thread pool approach is used in the method and system of this aspect of the present invention. Since the work pool is a shared read/write data structure, synchronization is necessary across all threads and some system overhead is required. In particular, if there is a large number of smaller size subproblems, this synchronization overhead can be significant. For problems where the subproblems' size distribution is relatively uniform, the thread pool approach should lead to an approximate balance of the load across processors. However, good load balance is not generally guaranteed by the thread pool approach.

Figure 4:
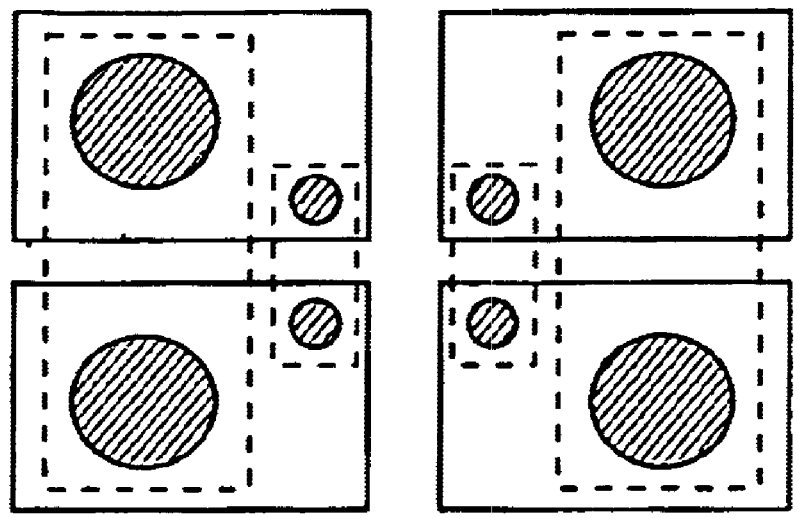
FIG. 4 is a graphical representation of a combinatorial optimization problem that has been decomposed into eight subproblems that are depicted as circles of the two different sizes to illustrate the two different sizes of the subproblems and their assignment to respective processors.

The method and system of this aspect of the present invention also uses a static load balancing policy coupled with fine-grain paralielization techniques. By way of example, FIG. 4 illustrates a situation in which a MAP has been decomposed into eight subproblems. As depicted, the two different sizes of the subproblems are represented by the different sizes of the circles. In order to schedule the eight subproblems onto four processors, the method and system of this aspect of the present invention will preferably analyze the size of the subproblems and schedule the subproblems as indicated by the solid line boundaries in which the subproblems located within each boundary are assigned to a respective processor. As such, the workload is relatively evenly balanced between the processors. In contrast, if the workload were assigned to the four processors as indicated by the dashed lines, the workload would be quite imbalanced and the solution of the subproblems would proceed in a much less efficient manner.

Preferably, the subproblems are scheduled across the processors in the most efficient manner while expending relatively little computing power on the scheduling. As such, the method and system of this aspect of the present invention includes a scheduling technique that assigns the subproblems to the various processors with little computing overhead. According to this technique, the size of each respective subproblem is initially determined. The size of the subproblem is typically based upon at least one of the number of associations and/or the number of measurements included within the subproblem. In one advantageous embodiment, a linear weighted measure $W_s$ is defined for each subproblem s as follows:

$$W_s = a_1 * A + a_2 * M$$

wherein $a_1$ and $a_2$ are non-negative scaling factors. For a set of subproblems S and a number of processors P, the average workload of each processor is then determined for an ideal situation in which the workload can be spread evenly between the processors as follows:

$$C_{SP} = \sum_{s \in S} \frac{W_s}{P}$$

The subproblems are then sorted, such as in descending order of $W_s$, i.e. sorted from large subproblems to small subproblems. The first unscheduled subproblem is assigned to a processor and additional subproblems are added to the workload of this processor until the workload assigned approaches, but is still less than the average workload $C_{sp}$. Once it is determined that no other subproblem can be assigned to the respective processor without exceeding the average workload $C_{sp}$, an updated average workload is then computed for the remaining subproblems and the remaining processors. This assignment routine is then repeated in a sequential manner for all remaining processors. As such, the subproblems can be efficiently assigned to the various processors in a relatively even manner without expending significant computing power during the assignment process.

Figure 5:
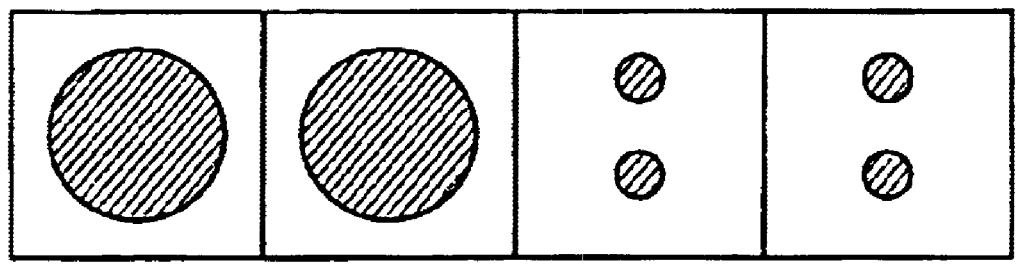
FIG. 5 is a graphical representation of a combinatorial optimization that has been decomposed into two fairly large subproblems and four fairly small subproblems and that is incapable of being assigned to a plurality of processors in a balanced manner by coarse grain parallelism techniques.

In order to further explain the subproblem assignment process, the steps of the subproblem assignment process can be summarized as follows:

- $S$ = set of all subproblems, $P$ = total number of available processors
- Sort $S$ in decreasing order of $W_s$
- For every processor $p = 1$ through $P$
    sum = 0;  $K = P - p + 1$
    compute $C_{SK}$ schedule the first problem $s$ in $S$ on $p$;  $S = S - \{s\}$
    sum = sum + $W_S$
    for all $s \in S$
        if(sum + $W_s$) ≤ $C_{SK}$ then
            schedule $s$ on processor $p$
            sum = sum + $W_s$
            $S = S - \{s\}$ In certain instances, the subproblems cannot be assigned to the processors in a manner that evenly distributes the workload between the processors. For example, FIG. 5 depicts a situation in which six subproblems of two different sizes, i.e. two fairly large subproblems and four fairly small subproblems as indicated by the respective sizes of the circles, are assigned in an unbalanced manner to four processors as indicated by the solid line boundaries. In order to more evenly distribute the workload amongst the processors, the method and system of this aspect of this present invention can also utilize fine-grain parallelism techniques for the larger subproblems. Fine grain parallelism is applied to the aspects of the LR algorithm that are amenable to parallel execution on multiple processors, primarily the nonsmooth function evaluations (i.e., solution of the relaxed problem) and the Lagrangian heuristic, as described hereinafter. Since this type of parallelism happens at a finer level in the algorithm, it is advisable to use it only for larger subproblems to minimize the effect of system overhead. In order to determine if fine-grain parallelism will be advantageous, the method and system of this aspect of the present invention measures the workload of each processor and determines the relative balance of the workload between the processors. See block 26. While different measures of the workload of each processor can be determined, the method and system of this aspect of the present invention typically determines the workload of each processor by measuring a weighted sum of the number of associations and the number of measurements included in the subproblem(s) assigned to the respective processor. The workloads of each processor can then be compared to determine the maximum variation between the cumulative size of the subproblems assigned to the respective processors. If the maximum variation is determined to exceed a predetermined threshold, the method and system of this aspect of the present invention will consider the subproblem to have been assigned in an unbalanced manner and will attempt to further balance the workload amongst the processors by fine-grain parallelism techniques as described above. See block 28. The maximum variation in the cumulative size of the subproblems assigned to the respective processors is less than the predetermined threshold, however, the method and system of this aspect of the present invention will consider the subproblems to have been assigned in a balanced manner and will not attempt to more finely balance the workload.

In instances in which a problem can be decomposed into subproblems that are then assigned to the plurality of processors, each processor proceeds to solve the respective subproblems to identify a set of updated tracks from among the candidate tracks such that the set of updated tracks includes each measurement only once and has the lowest cumulative cost. In particular, each processor executes the steps identified as blocks 30–50 in FIG. 2B in a parallel manner in order to collectively recover the primal x. Alternatively, in instances in which the combinatorial optimization problem cannot be decomposed into subproblems, the method and system of the present invention solves the entire problem in the same fashion as set forth by FIG. 2B, although fine-grain parallelism can still be applied in this case.

According to the method and system of the present invention, each processor initially determines the size of the problem or subproblems (hereinafter collectively referenced as a "problem") assigned to the respective processor and compares the size to a threshold value. See block 30. As described above, the size of a problem can be defined in various fashions, but is typically defined by the weighted sum of the number of the associations and the number of measurements included within the problem. If this number exceeds the threshold value, the problem will be considered to be large and will be solved, either exactly or approximately by an LR technique. However, if the problem is smaller than the threshold value, the problem will be considered small and will be solved, either exactly or approximately, by a branch and bound technique. In this regard, all subproblems could be solved, either exactly or approximately, by either method. An advantageous approach might be to solve small problems exactly by a branch and bound technique and solve large problems, either exactly or approximately, by an LR technique. Additionally, some problems, such as those involving a single measurement, may be so small so as to be trivial. In these cases, the problems can be solved by other techniques such as by picking the only possible solution without resorting to either branch and bound or Lagrangian relaxation techniques. For purposes of this discussion, any subsequent reference to small problems refers to those to be solved by branch and bound techniques and does not include these trivial problems.

If a problem is of a sufficiently small size to be solved by a branch and bound technique, the branch and bound technique will determine the primal x, that is, the vector x consisting of binary decision variables that identify which of the candidate tracks defined by the association matrix A are selected as the updated tracks. See blocks 32 and 50. A branch and bound technique is a well-known process wherein optimal solutions to a combinatorial optimization problem are found by implicit enumeration. Typically, this is described as examination of the nodes of a search tree in which these nodes represent feasible, partial (or complete) solutions to the problem. In this regard, branch and bound techniques are described in more detail both hereinabove and in A. Aho, J. Hopcroft, and J. Ullman, *Data Structures and Algorithms*, Addison-Wesley, Reading, Mass., (1983), J. Pearl, *Heuristics: Intelligent Search Strategies for Computer Problem Solving*, Addison-Wesley, Reading, Mass., (1984), A. Poore and N. Rijavec, *A Lagrangian Relaxation Algorithm for Multidimensional Assignment Problems Arising from Multitarget Tracking*, SLIM J. Optimization 3, No. 3, pp. 544–563 (August 1993) and the Poore '119 patent. The branch and bound technique of the present invention, as referenced in block 32 of FIG. 2B, is a depth-first search approach and differs from the above conventional depth-first search methods in its use of a control parameter(s) $P_0$ and/or $I_0$. As will be described in much greater detail below, the control parameter $P_0$ defines the total number of skips that can occur while analyzing any one branch of the search tree prior to terminating the analysis of the respective branch. As such, the control parameter $P_0$ can determine the thoroughness with which the tree is searched. Thus, computational workload may be traded off against solution quality. In a similar manner, computational workload may be reduced and traded off against solution quality by using a control parameter $I_0$ to limit the total number of nodes that are explicitly examined.

As such, instead of commencing the parallel processing in each processor with the decision block 30 inquiry as to whether the problem is "large", processing could always begin by using the branch and bound method with control parameters ($P_0$, $I_0$) to attempt to solve each problem. If the algorithm terminates with the actual number of nodes explicitly examined less than $I_0$, the problem would be declared to be "small" and "solved". Otherwise, the problem would be declared to be "large" and an attempt would then be made to solve the problem by a LR technique. For example, if $P_0$ is set very large and $I_0$ set modestly, then the "small" problems can be solved exactly. Moreover, "large" problems would be identified without too much work since $I_0$ was not set large. This approach could also be combined with an initial explicit test on problem size to "weed out" the excessively large problems which would then be solved by LR techniques.

In instances in which the problem is determined to be large, the problem is solved by an LR technique. LR techniques that relax some of the constraints to which the original MAP problem is subjected in order to simplify the solution process are generally well known. In this regard, the Poore '119 patent describes an LR technique that relaxes a number of the constraints to which the original problem is subjected, but that requires at least two index sets of constraints to remain fixed in order to define the relaxation strategy. In contrast to the conventional LR techniques applied to this problem, the LR technique of the present invention relaxes all of the index sets of constraints as explained hereinbelow. As such, the resulting problem is easier to solve, also provides valuable information regarding the solution of the original constrained problem, and does not require the existence of index-sets (i.e. scans).

By way of background, LR is a widely-utilized technique for solving difficult combinatorial optimization problems as described by J. E. Beasley, *Lagrangian Relaxation*, In Modern Heuristic Techniques for Combinatorial Problems, edited by C. R. Reeves, pp. 243–303, John Wiley & Sons, Inc., New York, N.Y. (1993). In LR, a subset of constraints, typically the difficult constraints, is targeted for relaxation by multiplying each constraint by a value termed the Lagrange multiplier or dual variable and moved into the objective function. The relaxed problem with its new objective and remaining easy constraints is then generally much easier to solve than the original problem. This solution of the relaxed problem provides a lower bound on the optimal objective function for the original combinatorial optimization problem. Thus, it is desirable to determine the values of the dual variables that maximize the objective function of the relaxed problem in order to more tightly define the optimal objective function of the original combinatorial optimization problem. Based upon values of the dual variables that maximize the objective function of the relaxed problem, a primal x can be recovered, although the primal x may be infeasible due to the relaxation of the constraints as described below.

The problem of finding values of the dual variables that maximize the objective function of the corresponding relaxed problem is called solving the Lagrangian dual and is generally solved by nonsmooth optimization techniques. These techniques are well known for solving Lagrangian duals as described by the Poore '119 patent. By way of background, one exemplary nonsmooth optimization technique is briefly described below. As mentioned above, one complication in LR is that the primal x resulting from the optimal solution of a Lagrangian dual may not be a feasible solution to the original combinatorial optimization problem. As such, a Lagrangian heuristic is employed to generate a primal x which is both feasible and relatively close to the optimal solution for the original combinatorial optimization problem.

In order to place the following more detailed discussion of this application of the LR technique (including the Lagrangian heuristic) in context, an overview is first provided. According to the present invention, a Lagrangian dual is initially constructed in which a dual variable is assigned to each measurement (including the maintained tracks) such that all constraints of the original combinatorial optimization problem are relaxed. See block 34. Thereafter, the Lagrangian dual is solved according to an iterative nonsmooth optimization technique as known to those skilled in the art. In each iteration, the nonsmooth optimization technique updates the values of the dual variables in order to maximize the Lagrangian dual. Each iteration involves nonsmooth function evaluation which requires solution of the relaxed problem. This results in the generation of a subgradient which may be added to the bundle, and a primal x, which may be evaluated for feasibility. If the number of infeasibilities is small, then the Lagrangian heuristic may be executed to produce a feasible primal x. When the optimality gap, i.e. the difference between the objective of the best dual solution and the best primal feasible x is sufficiently small, then x is returned as the solution to the original combinatorial optimization problem. When the optimality gap is not sufficiently small, the nonsmooth optimization process continues unless its termination criteria are satisfied. If the termination criteria are satisfied, the Lagrangian heuristic is executed and the best feasible primal x is returned as the solution to the original combinatorial optimization problem. In a tracking application, the primal x can therefore be interpreted to define which of the candidate or potential tracks or associations are selected.

In light of this brief overview, this application of the LR technique will now be described in more detail. The LR technique of the present invention relaxes all of the index set constraints and is therefore termed total constraint relaxation. With respect to the MAP formulation of equation set 1, total constraint relaxation implies that there is a dual variable for each maintained track, i.e., for each non-zero index in the set $T_o$, and also for each sensor measurement in every scan, i.e., each non-zero index in every set $M_j$, for $j=1,1\ldots,S$.

In this regard, the mathematical formulation of the relaxed problem of the MAP problem presented in equation set 1 is provided below.

Equation Set 3

Association set $H \subseteq T_0 \times M_1 \times \ldots \times M_s$

Define $H(j,k) = \{(i_0, i_1, \ldots, i_s) \in H \mid i_j = k\}$

Define dual variables $u_{t_j,j}$ for each nonzero index $i_j$ of set $j$

Define adjusted costs for association $(i_0, i_1, \ldots i_j, \ldots, i_s)$ to be:

$$c^*_{t_0 t_1 \ldots t_s} \equiv c_{t_0 t_1 \ldots t_s} + \sum_{\substack{j=0 \\ t_j \neq 0}}^{S} u_{1,j}$$

Minimize: 
$$\sum_H c_{t_0 t_1 \ldots t_s} \cdot x_{t_0 t_1 \ldots t_s} + \sum_{k_0=1}^{N_0} u_{k_0 0} \cdot \left\{ \sum_{H(0,k_0)} x_{t_0 t_1 \cdot t_s} - 1 \right\} +$$

$$\sum_{k_1=1}^{N_1} u_{k_1 1} \cdot \left\{ \sum_{H(1,k_1)} x_{t_0 t_1 \cdot t_s} - 1 \right\} +$$

$$\sum_{k_S=1}^{N_S} u_{k_S S} \cdot \left\{ \sum_{H(S,k_S)} x_{t_0 t_1 \cdot t_s} - 1 \right\} =$$

$$\sum_H c_{t_0 t_1 \cdot t_s} \cdot x_{t_0 t_1, t_s} + \sum_{j=0}^{S} \sum_{k_j=1}^{N_j} u_{k_j j} \cdot \left\{ \sum_{H(j,k_j)} x_{t_0 t_1, t_s} - 1 \right\} =$$

$$-\sum_{j=0}^{S} \sum_{t_j=1}^{N_j} u_{l,j} + \sum_H \left\{ c_{t_0 t_1 t_s} + \sum_{\substack{j=0 \\ t_j \neq 0}}^{S} u_{j,j} \right\} \cdot x_{t_0 t_1 \ldots t_s} =$$

$$-\sum_{j=0}^{S} \sum_{t_j=1}^{N_j} u_{j,j} + \sum_H c^*_{t_0 t_1 \ldots t_s} \cdot x_{t_0 t_1, t_s}$$

Subject to: $x_{t_0 t_1 \cdot t_s} \in \{0, 1\}$

As described above, the vector U of dual values is an input to this problem. In addition, the solution of the relaxed problem is optimized only with respect to the decision variables x. The only constraint being that these variables are binary, i.e., they assume values from the set $\{0,1\}$. After simplification, the objective function is shown to be the negative sum of all dual variables plus the sum of decision variables x multiplied by a corresponding adjusted cost $c^*$. This problem is easily solved by setting each decision variable with a negative adjusted cost to one and each decision variable with a positive adjusted cost to zero. If the adjusted cost is exactly zero then the decision variable may be either set to zero or one. Most of the work in solving this problem is in computing these adjusted costs. This computation is actually quite simple and is shown to be the initial cost plus the sum of the dual variables for the nonzero indices represented by the association in question. For example, in three dimensions, the association (3,0,2) with an initial cost of c has adjusted cost of $c^*=(c+u30+u22)$. In addition, the computation of the adjusted costs is a candidate for fine-grain parallelism.

In this regard, the dual variables $u_{ij}$ are initially defined for each non-zero index $i_j$ of set j. The dual variables are initially input and, can be defined to be equal to the values of the corresponding dual variables from the solution of the prior problem, i.e., from the solution of the Lagrangian dual that was most recently solved to determine the set of maintained tracks. In the case in which there is no corresponding dual variable, the value can be defined to be zero. In regard to multidimensional assignment problems, previous work has been done in regard to reoptimizing dual variables, see P. Shea and A. Poore, *Computational Experiences with Hot Starts for a Moving Window Implementation of Track Maintenance*, Proceedings of the SPIE, Signal and Data Processing of Small Targets, Vol. 3373, pp. 428–439 (April 1998).

While the Lagrangian dual will be primarily described in conjunction with the solution of a MAP, the formulation of the relaxed problem based on the SPT formulation of equation set 2 is set forth below and is related to the MAP formulation as described below.

Equation Set 4

Define adjusted costs $c_j^* = c_j + \sum_{i=1}^{M} u_i \cdot a_{ij}$

Minimize $\sum_{j=1}^{N} c_j \cdot x_j + \sum_{i=1}^{M} u_i \cdot \left\{ \sum_{j=1}^{N} a_{ij} \cdot x_j - 1 \right\} =$ $-\sum_{i=1}^{M} u_i + \sum_{j=1}^{N} \left\{ c_j + \sum_{i=1}^{M} u_i \cdot a_{ij} \right\} \cdot x_j =$ $-\sum_{i=1}^{M} u_i + \sum_{j=1}^{N} c_j^* \cdot x_j$ Subject to: $x_j \in \{0, 1\}$ In this formulation, the rows of the matrix $A=(a_{ij})$ represent the pooled set of maintained tracks and sensor measurements (i.e., the pooled set of measurements) and the columns represent the associations. If the SPT is translated from a MAP of dimension S+1, the number of rows in the SPT is $M=N_0+N_1+\ldots N_S$. When total constraint relaxation is applied to the SPT, one dual variable is required for each of the pooled measurements for a total of M dual variables. As shown above, the relaxed problem of equation set 3 is virtually identical to the relaxed problem of equation set 4. Again, the only constraint is that the decision variables x are binary, and the objective is the negative sum of all dual variables plus the sum of decision variables x multiplied by a corresponding adjusted cost $c^*$. Thus, the optimization process for the SPT formulation of equation set 4 is exactly as in the MAP formulation of equation set 3.

In addition, while the adjusted costs of the SPT formulation look a little different than the adjusted costs of the MAP formulation, the adjusted costs actually are also the same. Each adjusted cost is the initial cost of the association (for column j) plus the sum (across the rows) of $a_{ij}$ times the corresponding dual variable $u_i$. Since $a_{ij}$ is zero if a pooled measurement is not in the association and is one otherwise, the adjusted cost actually equals the initial cost plus the sum of the dual variables for the measurements that are part of the association. As such, the adjusted costs are the same for either an SPT formulation or a MAP formulation.

As described above, an SPK is likewise handled by transforming the problem into the corresponding SPT and utilizing the formulation defined by equation set 4. In fact, the method and system of the present invention applies the same approach with the MAP, essentially solving any problem instance of MAP, SPT, or SPK as an SPT. In any case, the Lagrangian dual problem is solved by finding the dual vector u, typically by nonsmooth optimization, which maximizes the dual function L(u) where L(u) provides a lower bound on the optimal objective function value for the original combinatorial optimization problem.

Since the Lagrangian dual is a piecewise linear function, it is typically maximized by nonsmooth optimization. See block 38. As mentioned above, nonsmooth optimization is a solution technique well known to those skilled in the art. See, for example, K. C. Kiwiel, *Proximity Control In Bundle Methods For Convex Nondifferentiable Minimization*, Mathematical Programming 46, pp. 105–122 (1990), H. Schramm and J. Zowe, *A Version Of The Bundle Idea For Minimizing A Nonsmooth Function: Conceptual Idea, Convergence Analysis, Numerical Results*, SIAM Journal on Optimization 2, pp. 121–152 (1992) and the Poore '119 patent. In this regard, software exists to maximize a Lagrangian dual function by nonsmooth optimization techniques.

A nonsmooth optimization technique is an iterative approach which determines the objective function value and a subgradient of the Lagrangian dual at each iterate. The collection of subgradients of the different iterates, termed a bundle, and the corresponding objective function value at each iterate form an upper piecewise linear approximation of the actual function, i.e., the Lagrangian dual. This upper approximation is oftentimes referred to as a model function. Because the model function is an upper approximation to the actual function, the point that maximizes this model function can define the next iterate of the nonsmooth optimization process. As such, the dual variables can be updated to be the point that defines the maximum of the model function. The objective function value and a corresponding subgradient and then can be added to the model function to form a refined upper approximation. The nonsmooth optimization algorithm can then continue with the new model function until an optimal solution is obtained. This nonsmooth optimization technique is generally described as a classical cutting plane algorithm.

Unfortunately, classical cutting plane techniques can suffer from slow convergence and possible unboundedness of the model function. In order to address the shortcomings of the classical cutting plane technique, the nonsmooth optimization technique is preferably improved, as known to those skilled in the art, to include a quadratic stabilization term that is added to the model function and is then multiplied by a step-size parameter that is, in turn, updated at each iteration based upon information obtained during the prior iteration. As also known to those skilled in the art, the nonsmooth optimization technique can also enhance and resolve the model function under certain conditions prior to beginning another iteration, as described below.

With respect to the enhancement of the model function prior to commencing another iteration, the nonsmooth optimization technique can initially determine an optimal solution to the model function and can determine if the iterate that solves the model function provides a sufficient increase in the actual objective function value as compared to the predicted increase according to the model function. If a sufficient increase in the actual objective function value is obtained, the optimal solution to the model function is taken as the next iterate and its corresponding subgradient and function value are added to create a new model function and the step-size parameter possibly is increased. As such, instances in which the optimal solution to the model function provides a sufficient increase are termed serious steps. If a sufficient increase in the objective function value is not obtained, however, the nonsmooth optimization technique determines if the new subgradient and the corresponding function value provides sufficient improvement to the model function. If the new subgradient and the corresponding function value provides sufficient improvement, the new subgradient and the corresponding function value are added to create a new model function, even though the nonsmooth optimization algorithm remains at the same iterate. Since the nonsmooth optimization algorithm remains at the same iterate, this step is termed a null step. In contrast, if the new subgradient and the corresponding objective function value do not provide sufficient improvement to the model function, the step-size parameter is reduced and the nonsmooth optimization algorithm remains at the same iterate and then optimizes the new model function.

The nonsmooth optimization technique continues updating and optimizing model functions and taking either serious or null steps until the current iterate satisfies one of the termination criteria. Various termination conditions can be defined including a maximum number of iterations of the nonsmooth optimization algorithm being taken or satisfaction of the nonsmooth optimality conditions as known to those skilled in the art. Alternatively, the termination criteria can depend upon the difference between the lower bound as defined by the maximization of the Lagrangian dual, and an upper bound based upon the best primal feasible solution. In any event, nonsmooth optimization techniques that include quadratic stabilization terms and step size parameters and that attempt to enhance the model function prior to commencing another iteration by determining if a serious step or a null step has been taken are known to those skilled in the art and are performed by existing software packages. These software packages include predefined optimality conditions such that the software package continues to solve a Lagrangian dual according to a nonsmooth optimization technique until at least one of the predefined optimality conditions has been met, at which point the solution consisting of an updated set of dual variables and, possibly, subgradient information and a primal x is provided.

According to the method and system of the present invention, the dual variables and the subgradients are both judiciously initialized in order to permit the nonsmooth optimization of the Lagrangian dual to proceed in an efficient manner. This is accomplished by making use of the results of a previously solved Lagrangian dual problem as part of a sequence of problems generated in the sliding window architecture described above and illustrated in FIG. 1. See block 36. By way of background, assume that the method of LR is being used to address the solution of a general combinatorial optimization problem that can be expressed as follows:

min $c^T x$ $Ax = b$ $x \in \{0, 1\}$,

In this general example, b serves as the right hand side of the constraints of the problem. For instance, in the current example, b equals the vector of ones which requires the set of updated tracks to include each measurement once and only once.

In addition, assume that the original Lagrangian dual is as follows:

$$\max_u L(u) \equiv \max_u \left\{ \min_{x \in \{0,1\}} c^T x + u^T (Ax - b) \right\}$$

and has been solved with u* being returned as an optimal solution. Furthermore, assume that the dimensions of A, b, and c remain the same, but that some or all of the coefficients have been changed slightly to $\tilde{A}$, $\tilde{b}$, and $\tilde{c}$. Therefore, the following related dual needs to be solved:

$$\max_u \tilde{L}(u) \equiv \max_u \left\{ \min_{x \in \{0,1\}} \tilde{c}^T x + u^T (\tilde{A} x - \tilde{b}) \right\}.$$

Because it is assumed that the coefficients of the related duals have not changed too much, it is reasonable to assume that the optimal solution to the new dual is close to the optimal solution u* of the original dual. As a result, it is reasonable to let u* be the initial iterate for the nonsmooth optimization algorithm when solving the new dual. As such, the dual variables from the final iteration of the prior problem are preferably utilized as the initial dual variables in the new problem.

More importantly, the method and system of the present invention also provides at least some of the subgradients of the function in question in order to attempt to further improve the nonsmooth optimization process. Typically, a relatively small number of the subgradients are provided, although any number of subgradients can be provided. In this regard, it could be the case that the initial dual variables actually solve or are close to an optimal solution of the dual, but that numerous iterations of the nonsmooth optimization algorithm are needed to calculate enough gradient information to determine an optimal solution. As a result, initial gradient information as well as dual variable information may allow a nonsmooth optimization algorithm to determine the optimal solution of the Lagrangian dual more efficiently.

A method is therefore described that obtains initial gradient information for use in maximizing the Lagrangian dual of the general combinatorial optimization problem set forth above, based upon an assumption that a sequence of related problems is being solved. The method will be described in conjunction with a solution technique in which all constraints of the original combinatorial optimization problem are relaxed. However, the method can be used for other relaxation strategies. Nevertheless, the technique for obtaining initial gradient information is typically easier in instances in which all constraints are relaxed.

As discussed above, at each iterate $u_k$ of the nonsmooth optimization algorithm, both a function value $L(u_k)$ and a sub gradient $g_k$ are calculated. A subgradient $g_k$ of the function L(u) at the point $u_k$ is a generalization of a gradient of a smooth function, and satisfies the following property:

$$L(u) \leq L(u_k) + g_k^T(u-u_k) \text{ for } u \in R^n,$$

wherein n is number of variables of the dual being maximized. It can be shown that $g_k = Ax(u_k) - b$ is a subgradient of the dual at the point $u_k$, where $x(u_k)$ generates the function value of the dual at $u_k$. Together, the iterates $\{u_1\}_{1 \in S_k}$ and corresponding function values $\{L(U)\}_{1 \in S_k}$ and subgradients $\{g_1\}_{1 \in S_k}$ form the following cutting plane model of the function in question:

$$L_{CP}(u) \equiv \min_{i \in S_k} \{L(u_l) + g_l^T(u - u_l)\} \text{ for } u \in R^n.$$

In this equation, $S_k$ denotes the set of integers corresponding to the iterates for which the calculated subgradients are currently in the bundle.

The cutting plane model is now rewritten for convenience. First, let $\alpha_{k1}$ denote the linearization error of the $i^{th}$ subgradient g at the current iterate $u_k$ so that the following formulas hold for each i and k:

$$L(u) \leq L(u_k) + g_1^T(u-u_k) + \alpha_{k1} \text{ for } u \in R^n,$$

wherein $$\alpha_{k1} \equiv L(u_1) - L(u_k) + g_1^T(u_k - u_1).$$

A linearization error measures how good a subgradient is at the current iterate $u_k$. The smaller the linearization error, the better the subgradient is at the current iterate. Also, notice that $\alpha_{kk} = 0$ so that the linearization error of the subgradient at the current iterate is equal to zero.

Furthermore, let $d \equiv u - u_k$. After eliminating the constant $L(U_k)$ from the cutting plane model, the following formula holds at the current iterate $u_k$:

$$L_{CP}(u_k; d) \equiv \min_{t \in S_k} \{g_t^T d + \alpha_{ks}\} \text{ for } d \in R^n.$$

As briefly described above, a quadratic stabilization term multiplied by a step-size parameter $t_k \equiv R_+$ is added to the cutting plane model, producing the following model function that is optimized at each iteration:

$$L_M(u_k; d) \equiv L_{CP}(u_k; d) - \frac{1}{2t_k} \|d\|_2^2 \text{ for } d \in R^n.$$

In this equation, $\|\cdot\|_2$ denotes the standard Euclidean norm. At each iteration, the dual of the model function is optimized. This involves solving a quadratic programming problem, and one possible approach to solving this problem is described in Antonio Frangioni, "Solving Semidefinite Quadratic Problems Within Nonsmooth Optimization Algorithms," *Computers and Operations Research*, 23(11), pp. 1099–1118 (1996).

To be able to stop the iterative nonsmooth optimization process with u* as an optimal solution to the original problem, the bundle of subgradients $\{g_1\}_{i \in S_k}$ as well as the corresponding linearization errors $\{\alpha_{k1}\}_{i \in S_k}$ are used to prove that the optimality conditions are satisfied at u*. In particular, the subgradients and corresponding linearization errors are used to show that the zero vector was approximately in the subdifferential of the function at u*. As a result, an initial bundle of subgradients as well as the corresponding linearization errors can be used to construct an initial cutting plane model and should reduce the number of dual function and gradient evaluations needed to determine an optimal solution.

To calculate an initial bundle to start the optimization of the new dual, it is noted that each element in the final bundle was calculated at one iteration. In particular, let $u_k$ denote the dual variable at which a subgradient was added to the bundle, and let $x(u_k)$ be the point that generated the value of the dual at $u_k$ (i.e., $L(u_k)$). It can be shown that the subgradient added to the bundle at the point in question is given by $g_k = Ax(u_k) - b$. Because it is assumed that the dimension of the original combinatorial optimization problem has not changed and all constraints have been relaxed, each $x(u_k)$ remains feasible for the new dual. As a result, a subgradient of the new dual at the point $u_k$ is given by $\tilde{g}_k = \tilde{A}x(u_k) - \tilde{b}$. In particular, any $x(\tilde{u})$ that is feasible for the new dual function generates a subgradient. However, the $x(\tilde{u})$'s that generated the final bundle of the original problem are used for the new problem. Since it is assumed that because the dual has not changed too much between the original problem and the new problem, these points will give subgradient information that is near to the optimal solution of new dual.

It also is the case that the linearization errors for the initial subgradients in question need to be calculated. In this case, the following formula gives the linearization error for the subgradient associated with $x(u_j)$:

$$\alpha_{1j} = \tilde{c}^T x(u_j) + (u^*)^T (\tilde{A}x(u_j) - \tilde{b}) - \tilde{L}(u^*),$$

wherein $\tilde{L}(u^*)$ is the value of the new dual at u*.

With respect to the initialization of the dual variables and subgradient in a sliding window architecture, it is noted that one dual variable is assigned for each maintained track and sensor measurement. In addition, it is noted that the next Lagrangian dual to be solved involves all but the oldest scan of sensor measurements from the prior problem in addition to a new set of sensor measurements. Therefore, the initial dual variables corresponding to the measurements that remain from the prior problem are set equal to the corresponding optimal dual variables determined during the solution of the prior Lagrangian dual, i.e., the Lagrangian dual for the prior problem. With respect to the dual variables corresponding to the new sensor measurements, the initial values for these dual variables are typically set equal to zero. However, other dual variable initializations are possible. In this regard, see P. Shea and A. Poore, *Computational Experiences with Hot Starts for a Moving Window Implementation of Track Maintenance*, Proceedings of the SPIE, Signal and Data Processing of Small Targets, Vol. 3373, pp. 428–439 (April 1998) regarding reoptimization of dual variables in a sliding window architecture.

In solving a sequence of related Lagrangian duals in a sliding window architecture, the bundle of subgradients is also preferably initialized in a manner that permits the next Lagrangian dual to be solved in an efficient manner. To generate an initial bundle for a Lagrangian dual problem, a set of "x's" for the new problem can be used. In this sliding window context, an x is a vector whose size is the number of associations in the primal problem and whose ith entry is equal to 1 if the ith association is included in the total solution and is equal to 0 otherwise. Because of the sliding window, there is not necessarily a straightforward method to generate a set of "x's" for the new problem from the set of "x's" from the original problem, i.e., prior problem. For example, the definition of an association has changed in that the first set of sensor measurements in the original problem was eliminated while a new set of sensor measurements was added to the new problem.

To generate a new set of "x's" for the new problem, a set of "x's" is preferably generated so that the new set of subgradients are close to the old set of subgradients. Because the dimensions of the subgradients for each problem possibly are different, the closeness of the new set of subgradients to the old set of subgradients would have to be defined based upon the particular problem.

A brief description of one possible method for extending the "x's" is now provided. However, other methods are possible. Consider an x that was used to form a subgradient in the final bundle when solving the first Lagrangian dual, i.e., the prior Lagrangian dual. Next, consider the first index i such that $x_i=1$ (i.e., the first association i that is included in the solution represented by x). The associations in the set of associations for the new problem that use the same measurements in the first S scans of the new problem are now determined. If this set is not empty, the association with the minimum cost from this list is picked and the corresponding entry of the new x is set equal to 1. This new association is then crossed off the list for consideration in the extension of the current x. If there are no associations in the new list that use the same measurements in the first S scans of the new problem, none of the coefficients are set equal to 1 in the new x. This procedure is repeated for each index i such that $x_i=1$. Finally, the above procedure is repeated for each x that was used to form a subgradient in the final bundle when solving the previous problem. If any of the new "x's" are identical, just one of them is taken when forming the initial bundle, which includes both the subgradients and corresponding linearization errors, for the new problem.

Above, a method for reoptimizing subgradient information based upon saving the x's that generated the subgradient at each iteration was described. As another possible approach, the u's where the subgradients in the bundle were generated could be saved. The u's then could be extended to be valid for the new problem. As one possible approach, corresponding entries could be left the same and the new entries could be set equal to zero. However, there are many other possibilities. Finally, a subgradient at each of these points could be added to the bundle.

Based upon the judiciously selected initial values of the dual variables and the bundle, the nonsmooth optimization technique proceeds iteratively to optimize the Lagrangian dual. In each iteration of the nonsmooth optimization technique, the Lagrangian dual objective is increased and the values of the dual variables are updated based upon one or more function evaluations which require solution of the relaxed problem. This results in the generation of subgradients which may be added to the bundle, and a primal x, which may be evaluated for feasibility. Likewise, the model function is updated and evaluated. If a serious step has been taken, the iteration is considered complete, otherwise, the nonsmooth optimization technique continues to enhance the model function as described above.

If a serious step has been taken and the current iteration of the nonsmooth optimization technique has been completed, a primal x has also been determined. As described above, the primal x for the current iterate is solved by setting each decision variable with a negative adjusted cost to one and each decision variable with a positive adjusted cost to zero. Since the adjusted costs depend upon the dual variables, the updating of the dual variables during the respective iteration of the nonsmooth optimization algorithm can also alter the resulting primal x.

The primal x is then evaluated to determine its infeasibility. See block 40. If the primal x is infeasible, a Lagrangian heuristic can be executed to construct a feasible primal x. See block 42. In order to conserve computing resources, the Lagrangian heuristic is typically executed if the primal x is only slightly infeasible or following execution of a predetermined number of iterations of the nonsmooth optimization routine. Otherwise, another iteration of the nonsmooth optimization routine would otherwise be conducted. In other embodiments, however, the Lagrangian heuristic can be executed following every iteration, if so desired.

In instances in which the decision to execute the Lagrangian heuristic depends upon the relative infeasibility of the primal x, the infeasibility of the primal x is determined by analyzing the product of the association matrix A and the primal x. For each measurement that is an element of the association matrix A, a count is made of the number of updated tracks, as selected by the primal x, that include the measurement. If a measurement is used by a single updated track, the solution is considered feasible. However, if the measurement is not used exactly once, the solution is considered infeasible and a count is made of the deficiency or surplus number of updated tracks that include the measurement. By summing the infeasibility count for each measurement, a measure of the cumulative infeasibility of the primal x is obtained. In this regard, the infeasibility can be expressed as Ax−1. By comparing this cumulative infeasibility to an infeasibility threshold, it is determined if the primal x is close enough to a feasible solution to be subjected to a Lagrangian heuristic or if the infeasibility of the primal x is so great as not to merit being subjected to the Lagrangian heuristic, in which case the nonsmooth optimization process is repeated.

According to the present invention, the Lagrangian heuristic is a hybrid branch and bound and LR technique designed to construct a feasible primal x. By way of background, a Lagrangian heuristic is advantageous since an optimal, or approximately optimal, solution to the Lagrangian dual may not provide a primal x which is a feasible solution to the original combinatorial minimization problem since the constraints were relaxed and placed into the objective function. As such, a Lagrangian heuristic utilizes dual information to produce a primal x which is both feasible and close to the optimal solution to the original combinatorial minimization problem. While the Lagrangian heuristic of the present invention utilizes a depth-first search of a branch and bound search tree as described by A. Poore and N. Rijavec, *A Lagrangian Relaxation Algorithm for Multidimensional Assignment Problems Arising from Multitarget Tracking*, SIAM J. Optimization 3, No. 3, pp. 544–563 (August 1993) and others, the Lagrangian heuristic of the present invention differs from conventional branch and bound approaches for solving the MAP in at least two significant manners. First, dual variable information can be incorporated to reorganize the tree in order to improve efficiency by increasing the likelihood of finding good solutions early in the process. Second, the search may be controlled by parameter(s) P and/or I so that only selected portions of the tree are ever examined, with the method then becoming an approximation algorithm. In this regard, the portions of the search tree examined are believed to have a greater likelihood of containing the good or optimal solutions For example, assuming I=infinity, when P=0, the Lagrangian heuristic becomes a greedy approach and when P=infinity the entire search tree is searched. The advantage is that P and I may each be separately adjusted for the branch and bound searches conducted at different stages in the solution process (see blocks 32, 42 and 48) to tradeoff computational workload versus the desire for more accurate solutions. These control parameters are designated $P_0$, $P_1$ and $P_2$ and $I_0$, $I_1$ and $I_2$ in FIG. 2B.

As described above, the Lagrangian heuristic can solve instances of MAPs, SPTs and SPKs by efficiently translating the problem, if necessary, into an instance of an SPT and then solving the problem. Thus, the Lagrangian heuristic will make no use of the "scans" that might exist in the problem. Accordingly, the method and system of the present invention may be particularly advantageous for analyzing multisource asynchronous data. In addition, maintained tracks and sensor measurements (referred to henceforth as measurements) are "pooled" without regard to any scan structure that may exist. Further, the cardinality of an association is defined as the number of nonzero measurements in that association.

By way of example, a greedy selection algorithm is described. As described below, the Lagrangian heuristic will be equivalent to a greedy algorithm when P=0 is used. In any event, the idea is to place the potential associations, i.e., the candidate tracks, in some kind of order and to process them one-by-one. At each step, the association under consideration will be kept if and only if it is feasible with respect to previously selected associations, that is, if no previously selected association contains a measurement belonging to the current association. This process continues until every measurement is used exactly once. The algorithm will always terminate successfully because of the assumption of the existence of all false alarms. Though any association order may be used, the use of dual variable information should increase the effectiveness of the Lagrangian heuristic. Therefore, the Lagrangian heuristic of the present invention sorts the potential associations in increasing order of adjusted cost per nonzero measurement, i.e., adjusted cost divided by the cardinality of the association.

By way of explanation of the general algorithm, consider that the list of potential associations has been ordered by increasing adjusted cost per nonzero measurement. In this regard, a dual variable of zero can be used for any measurements that do not otherwise have a dual variable. Next, associations are picked from the ordered list to be part of a feasible solution. At the first level of decision making, an association can be picked from any point in the ordered list. At the second level, an association, feasible with respect the first association, will be picked that occupies a place in the ordered list after the first selected association. In general, at decision level l, an association, feasible with respect to all previously selected associations, will be picked that occupies a place in the ordered list after the association selected at level l−1. Note that there is no requirement to pick the first feasible solution available after the association selected at level l−1. Thus, some feasible associations can be skipped in order to jump ahead to others later in the list. However, the number of skips that are accumulated in this process are counted. This count of the number of skips can be compared to the parameter P to constrain the search, so that, once the accumulated number of skips becomes too large, that particular sequence of decisions can be abandoned and a different sequence can be considered.

The Lagrangian heuristic of the present invention is subject to the following observations:

1. An optimal solution to the revised combinatorial minimization problem (with adjusted costs) is optimal with respect to the original set of costs (although the objective values will differ by the sum of the multipliers). Thus, a good/optimal solution to this revised problem will be sought.

2. If the next available association (from a feasibility standpoint) is always picked, that is, a feasible association is never skipped, then the algorithm becomes identical to the greedy algorithm.

3. At each point in the process, the set of selected associations can be immediately extended to a feasible solution by augmenting the set with false alarm, associations for all unused measurements.

4. If, after the level 1 decision, the only downstream associations are of the false alarm variety, then continuation of the process with respect to currently selected associations, will not improve on the false alarm extension described in step 3.

In more detail, the search tree includes a root node (l=0) that has N children, one for each association. According to the present invention, the N children are preferably ordered from left to right by increasing adjusted cost per nonzero measurement. This first level in the tree (the level below the root node) will represent the first decision in the sequential process described above. Each of the nodes in the first level (l=1) will then have a child for every potential association which is feasible with respect to the association represented by the parent node, i.e., the respective node on the first level. In general, a node at level l+1 will be given a child for every potential association that is feasible with respect to all associations in the unique path along the branch from that child to the root node.

The Lagrangian heuristic uses a depth-first search strategy to explore this search tree which, in its entirety, represents every set of feasible decision sequences described above. Each node represents a partial solution that can be immediately extended, using false alarms, to a complete solution. The search will preferably be constrained, however, by a maximum total number of P skips, so that when P=0, the algorithm will reduce to greedy selection, and when both P and I equal infinity, the algorithm will either implicitly or explicitly examine every possible sequence. Additionally, as described earlier, the search in some embodiments may also be constrained to the total number of nodes that will be explicitly examined as designated by I. The rationale is that, for large problems, the value of P and/or I can be used to constrain the search to only part of the tree, albeit a part which has a good chance of containing the best solutions. The outcome from a search of the part of the tree will then be an approximate solution with value V corresponding to the sum of the adjusted costs of the selected associations. While the approximate solution with value V is generally accepted, the method and system of one alternative embodiment can re-execute the algorithm with a larger value of P and/or I, but with the value V input as an incumbent solution to increase the effectiveness of the bounding function, as described below. For small problems, P and I are typically set to infinity to obtain an exact solution. In this regard, the branch and bound step depicted by block 32 of FIG. 2B can include a relatively large P and 1 since the problem is generally smaller.

The search process can also be bounded based upon the value of an incumbent solution. In this regard, suppose that at level 1 in the process, K skips have accumulated and the selected associations have a total adjusted cost of C in comparison to a best incumbent solution of value V. Suppose also that there are M unused measurements at this point in the process. Furthermore, suppose that the next feasible association has an adjusted cost per non-zero measurement of Z. Since the associations are ordered by adjusted cost per nonzero measurement, it must be true that a feasible solution extending the set of associations already selected cannot be less than C+M*Z. Therefore, if V is less than or equal to C+M*Z, the sequence of decisions already made cannot lead to an improved solution and should, therefore, be abandoned. This process is the basic idea of the bounding function in the algorithm. The bounding function will effectively prune the search tree and cause the algorithm to backtrack and make a change to the previous decision sequence. In a similar manner, if the number of accumulated skips K exceeds the value of the parameter P, then that particular sequence of decisions will be abandoned by pruning the search tree and backtracking.

Consider the following MAP example in which the associations have been sorted by adjusted cost per nonzero measurement (CPM). The column labeled "J" indicates the original association index before sorting:

| | Example | | |
|---|---|---|---|
| J | Desc | AC | CPM |
| 5 | 2131 | −3 | −0.75 |
| 1 | 1012 | −2 | −0.67 |
| 2 | 1132 | −2 | −0.50 |
| 3 | 2021 | −1 | −0.33 |
| 4 | 2112 | −1 | −0.25 |
| 6–13 | false | 0 | 0.00 |

The example has 4 index sets (labeled 0,1,2, and 3) with (2,1,3,2) nonzero elements per set. There are five associations plus all (i.e., 8) false alarms. For convenience, it has been assumed that the false alarms have adjusted costs (AC) of zero. The association description indicates which indices, by set, are associated. For example 2131 indicates that index 2 from set 0, index 1 from set 1, index 3 from set 2, and index 1 from set 3 are associated.

Figure 6:
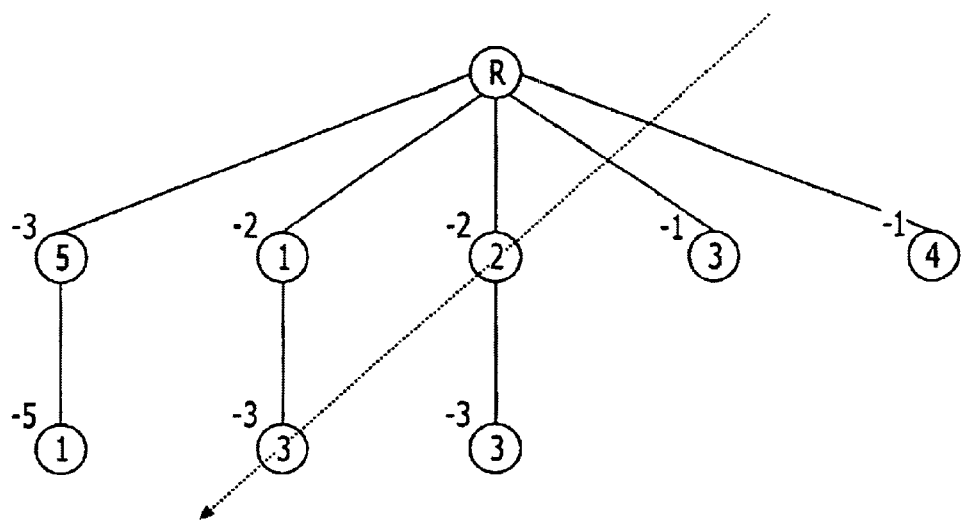
FIG. 6 is a search tree ordered according to adjusted cost per non-zero measurement according to one embodiment of the present invention.

FIG. 6 shows the search tree for this example with the adjusted cost of the extended solution placed just outside but next to the node. Simple bounding, as described above, will eliminate explicit examination of the nodes to the right of the "narrow" indicated in the figure since the rightmost nodes will not yield an improved solution with a lower total cost.

Figure 7:
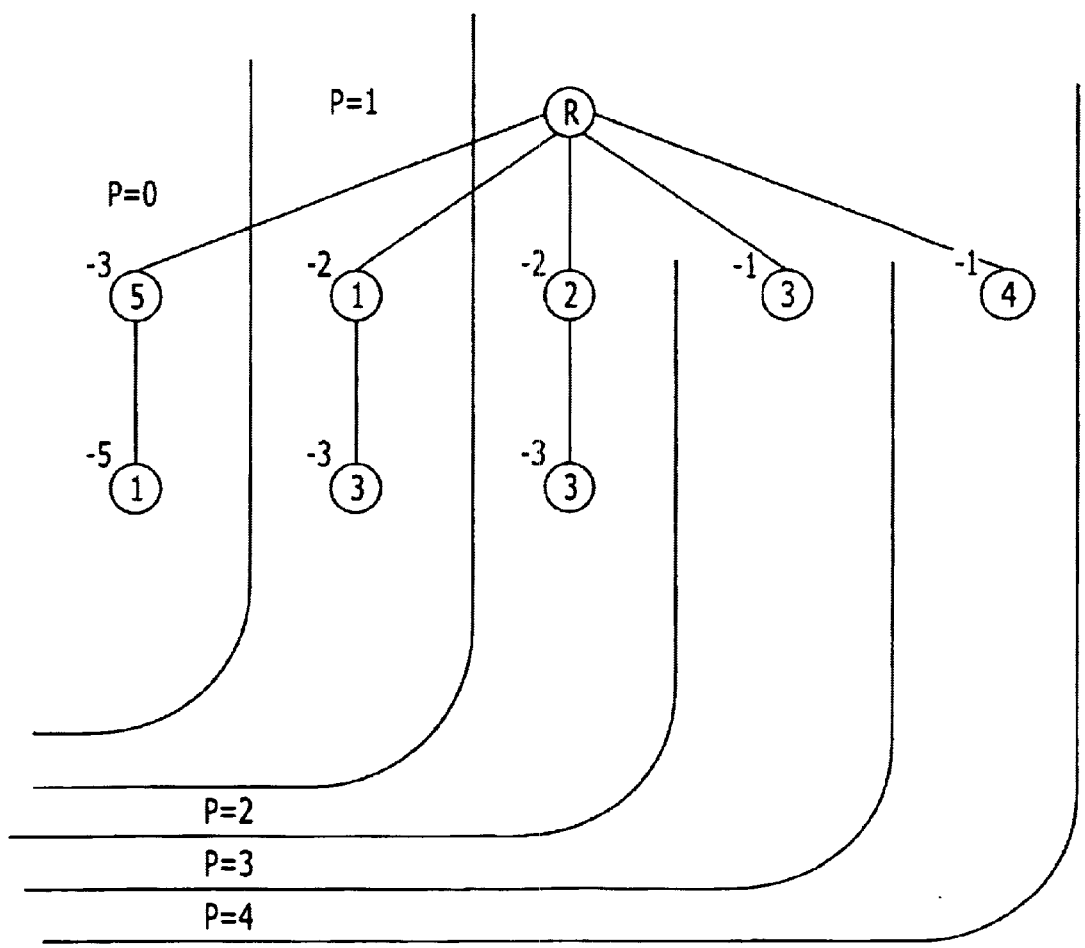
FIG. 7 is another representation of the search tree of FIG. 6 which illustrates the portions of the search tree that can be examined for different control parameter values of P=0, 1, 2, 3, and 4.

In addition, FIG. 7 shows the nodes of the same search tree that are examined for various values of P in the constrained approach described above. Note that the leftmost path through the tree corresponds precisely with the greedy selection approach. Also note the rough correlation between the goodness of the solutions and the corresponding value of P. Good bounding functions will allow us to search the tree without explicitly examining each and every node. In this regard, a backtrack step will prune the entire subtree below a particular node which will save much work. The effectiveness of the Lagrangian heuristic will therefore generally depend both on the bounding function and the organization of the nodes in the tree.

The algorithm of this aspect of the present invention can be implemented with standard approaches for depth-first search with backtracking. These approaches do not explicitly construct the search tree in advance because it is typically much too large. Instead, nodes in the tree are generated as needed. By way of explanation, however, the following implementation topics will be discussed: (1) bounding, involving the selection of an easy to compute, yet effective, bounding function; (2) feasibility testing for associations, involving the strategy and data structures for efficiently evaluating, given a current partial solution, the feasibility of the subsequent associations on the list; (3) feasibility of a partial solution extension, involving the effective recognition of when a partial solution has no feasible extension with respect to the subsequent associations on the list; and (4) generalization, involving an extension of the algorithm to the case in which there may not be a complete set of false alarm associations.

There are more complicated bounding functions possible besides the simple approach discussed above. This simple function essentially assumes that all remaining unused measurements can be used at an adjusted cost per non-zero measurement equal to that of the association under consideration. Certainly, because of the ordering of the associations, this cost is less than or equal to the actual cost of using the remaining measurements. However, this actual cost may not be that small since the adjusted cost per non-zero measurement may increase as associations are selected from further down the list. Another possibility is to compute the cost bound by scanning down the ordered list until the sum of the cardinalities of the associations equals the number of unused measurements. Although this technique requires more calculations, it usually provides a better bound, and sometimes improves overall effectiveness by reducing the number of nodes in the tree which are explicitly examined. Other bounding functions are also possible.

In depth-first search methods, the search tree is not constructed in advance because it is typically much too large. Instead, nodes in the tree are generated as needed. The most complicated aspect of implementing this approach concerns the efficient generation of the children nodes of a given parent node. The typical task is to find the next association on the ordered list which is feasible with respect to previously selected associations. This task involves a careful design and implementation of data structures compatible with the overall processing strategy, but is in no way complicated by the unique aspects of the Lagrangian heuristic of the present invention, i.e., the use of dual variable information and the search control parameter P and/or I.

There are many approaches for efficiently finding the children nodes of a given parent node. One such approach is briefly described in A. Poore and N. Rijavec, *A Lagrangian Relaxation Algorithm for Multidimensional Assignment Problems Arising from Multitarget Tracking*, SIAM J. Optimization 3, pp. 544–563 (August 1993). According to the Lagrangian heuristic of this aspect of the present invention, the feasibility of an association $A_0$ is preferably only determined when needed rather than, for example, calculating the feasibility of all other associations every time that a new association is selected for inclusion in a partial solution to the problem. In order to further accelerate the process of identifying children nodes, when an association $A_0$ is found to be infeasible with respect to the current partial solution, the association $A_1$ in the partial solution appearing earliest in the sorted list which caused the unfeasibility is determined. Then $A_0$ is added to a linked list of other infeasible associations whose infeasibility was caused first by association $A_1$. This is so that work may be saved later in the process if the feasibility question is asked again of association $A_0$. If $A_0$ is in one of these linked lists then it is known to be infeasible. If it is not in a linked list, the infeasibility of $A_0$ must be assessed. The above-described approach is straightforward to implement and has also been shown to be efficient.

Once the order of the associations has been calculated for executing the branch and bound, it is possible to determine for each measurement m, the last association T(m) on the list which uses that measurement. The idea is that once the search has proceeded past T(m) for any unused measurement m then the partial solution cannot be extended to feasibility. It turns out, by sorting the T(m) vector in preprocessing, there is an efficient way to figure out the minimum value of T(m) for a given partial solution. This can be used to determine how far down the list of associations to search for a new association to add to the current partial solution, since going past that point will guarantee infeasibility.

Using the ideas expressed above, it is relatively easy to generalize the algorithm for the case in which a complete set of false alarms is not available. For the unrestricted version of the algorithm (i.e., P=infinity and I=infinity), as the list of associations is traversed, one of three things will happen: (1) a totally feasible solution will be constructed, or (2) it will be determined that the current partial solution has no feasible extension and a backtrack step will occur, or (3) it will be determined that the current partial solution cannot have a feasible extension better than the best incumbent solution obtained so far and a backtrack step will occur. Of course, when the complete set of false alarms is not available, there may not be a feasible solution to the problem. Based on the observations above, the generalized unrestricted algorithm (with no skips) will find an optimal feasible solution if one exists or else determine that the problem is infeasible.

To summarize, the Lagrangian heuristic of this aspect of the present invention advantageously utilizes dual variable information to reorganize the search tree in order to improve efficiency by increasing the likelihood of finding good solutions early in the process. In addition, a control parameter P can be used to constrain the search. This control parameter enables the algorithm to become an efficient approximation approach for use as a Lagrangian heuristic.

As described above, the method and system of the present invention preferably utilize a parallel processing architecture in which various subproblems are assigned to respective processors in a manner that is intended to even the workload amongst the processors. However, the size of the subproblems may dictate that the subproblems cannot be assigned in a manner that balances the load amongst the processors. See FIG. 4. As such, the method and system of the present invention also preferably include fine grain parallelism techniques for dividing the work of solving at least some of the larger subproblems into parts that are executed in parallel by different ones of the processors. In this regard, at least some of the functions performed during the construction and analysis of the search tree of the Lagrangian heuristic can be divided into parts and executed in parallel by a plurality of processors if it is determined that the subproblems are not otherwise capable of being assigned in a relatively even manner. In this regard, the sorting of the associations by adjusted cost per non-zero measurement may be executed in parallel on multiple processors. In addition, at least some of the searching in the branch and bound search tree can be amenable to parallel execution. By dividing the original problem into subproblems and, with respect to at least the larger subproblems, further dividing the work of solving these subproblems into parts that are executed in parallel by different ones of the processors, the efficiency of the overall method and system is significantly improved since better use is made of the computing resources.

Upon concluding the Lagrangian heuristic of block 42, the primal x that identifies the selected set of associations from the original association matrix A is determined. Based upon the best primal feasible x, the solution of the problem, such as the MAP, can be evaluated to determine if the solution is sufficient or if further nonsmooth optimization is desired. See block 44 of FIG. 2.

In this regard, the optimality gap is evaluated to determine if it is sufficiently small or if further iteration is required. The maximization of the Lagrangian dual provides a lower bound to the optimal solution to the original combinatorial problem. In addition, an upper bound to the original problem is given by the objective function value associated with any feasible primal x, i.e., $$\sum_{j=1}^{N} c_j x_j.$$

The difference between the best upper bound and the best lower bound therefore defines an optimality gap. As the optimality gap becomes smaller, the confidence that an adequate solution to the original combinatorial problem has been found increases. In contrast, a relatively large optimality gap indicates that an adequate solution to the original combinatorial optimization problem may not yet be found.

In addition to the evaluation of the optimality gap, the dual solution can be evaluated to determine if the dual solution is satisfactory, as also shown in block 44. Various criteria can be implemented to determine if the dual solution is satisfactory. As described above, the maximum number of iterations of the nonsmooth optimization routine can be defined such that upon completion of the maximum number of iterations, the solution is automatically found to be satisfactory. Alternatively, other termination criteria can be defined based upon the nature of the problem as known to those skilled in the art.

Based upon the analysis of the optimality gap and the dual solution, a decision is made in block 44 as to whether the nonsmooth optimization routine of block 38 is to be repeated. If both the dual solution is found to be unsatisfactory and the optimality gap is found to be too large, the nonsmooth optimization routine of block 38 is repeated. However, if the optimality gap is found to be sufficiently small, the decision block depicted as element 46 in FIG. 2B can be bypassed and the primal x can be returned as an exact or approximate solution to the original combinatorial optimization problem as shown in block 50.

Alternatively, if the dual solution is found to be satisfactory, the optimality gap can be evaluated as shown in block 46. In this regard, the evaluation of the optimality gap in block 46 indicates that the optimality gap is sufficiently small, the primal x can be returned as an exact or approximate solution to the original combinatorial optimization problem. See block 50. However, if the analysis of the optimality gap of block 46 indicates that the optimality gap is not sufficiently small, the hybrid branch and bound and the Lagrangian relaxation technique described above in conjunction with the Lagrangian heuristic of block 42 is again executed, although typically with other control parameters $P_2$ and/or $I_2$. See block 48. As with the prior discussion of the Lagrangian heuristic set forth in block 42, portions of the Lagrangian heuristic of block 48 may be assigned to different processors for parallel execution if the assignment of the subproblems is otherwise unbalanced. Upon completing this additional Lagrangian heuristic, the primal x is returned as an exact or approximate solution of the original combinatorial optimization problem. See block 50. Thereafter, the sliding window architecture depicted in FIG. 1 can update the various parameters and can then slide the window forward to include yet another scan of sensor measurements prior to repeating the operations depicted in FIGS. 2A and 2B.

In addition to the sensors 52 for obtaining the sensor measurements, the solver 55 of the present invention preferably includes a computer 54 having a parallel processing architecture as described above that includes a plurality of processors 56 and memory 58, as shown in FIG. 3B. The computer also preferably includes a computer program product that is stored in a computer-readable storage medium, such as memory, and is accessible by the processors. The computer-readable storage medium has computer-readable program code means, such as a series of computer instructions, embodied therein for solving the original combinatorial optimization problem, such as to update the tracks of a plurality of objects. As such, the computer-readable program code means preferably includes means for performing the various operations described above and depicted in FIGS. 2A and 2B.

In this regard, FIGS. 2A and 2B and FIGS. 3A and 3B are block diagrams of a method, system and computer program product according to one advantageous embodiment of the invention. It will be understood that each block or step of the block diagram and combinations of blocks in the block diagram can be implemented by computer program instructions. These computer program instructions may be loaded onto the computer or other programmable apparatus to produce a machine, such that the instructions which execute on the computer or other programmable apparatus create means for implementing the functions specified in the block diagrams. These computer program instructions may also be stored in a computer-readable memory that can direct the computer or other programmable apparatus to function in a particular manner, such that the instructions stored in the computer-readable memory produce an article of manufacture including instruction means which implement the function specified in the block diagrams. The computer program instructions may also be loaded onto the computer or other programmable apparatus to cause a series of operational steps to be performed on the computer or other programmable apparatus to produce a computer implemented process such that the instructions which execute on the computer or other programmable apparatus provide steps for implementing the functions specified in the block diagrams.

Accordingly, blocks or steps of the block diagrams, flowchart or control flow illustrations support combinations of means for performing the specified functions, combinations of steps for performing the specified functions and program instruction means for performing the specified functions. It will also be understood that each block or step of the block diagrams, flowchart or control flow illustrations, and combinations of blocks or steps in the block diagrams, flowchart or control flow illustrations, can be implemented by special purpose hardware-based computer systems which perform the specified functions or steps, or combinations of special purpose hardware and computer instructions.

Regardless of its implementation, the method, system and computer program product of the present invention provides an efficient technique for solving relatively complex combinatorial optimization problems. For example, the method, system and computer program product of one advantageous embodiment of the present invention effectively tracks a plurality of objects, even though the objects may be closely spaced, maneuverable and have low observability. By reliably tracking the plurality of objects in real time, the method, system and computer program product of the present invention can report a variety of applications, including military and commercial aerospace applications in which the position, velocity, acceleration, and other state variables of a plurality of objects must be tracked in a real time and accurate fashion.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A method of constructing a plurality of updated tracks based upon associations of a plurality of measurements, wherein the measurements are subject to a plurality of constraints, and wherein the method comprises:
   relaxing each of the constraints, said relaxing step comprising providing a dual variable for each constraint;
   constructing a Lagrangian dual function that at least partially depends upon the dual variable for each constraint and a cost associated with each potential association;
   determining a solution of a Lagrangian dual problem, said determining step comprising determining a value for each dual variable based upon an evaluation of the Lagrangian dual function; and
   determining the associations that define the plurality of updated tracks based at least partially upon the value determined for the dual variable associated with each constraint.

2. A method according to claim 1 wherein determining the solution of the Lagrangian dual problem comprises maximizing the Lagrangian dual function.

3. A method according to claim 1 further comprising:
   determining if a value of the Lagrangian dual function is acceptable prior to determining the associations that define the plurality of updated tracks; and
   repeating said steps of constructing the Lagrangian dual function and evaluating the Lagrangian dual function if the prior value of the Lagrangian dual function is unacceptable.

4. A method according to claim 1 wherein providing the dual variable for each constraint comprises providing an initial value for the dual variable for each constraint, and wherein determining the value for each dual variable comprises determining an updated value for each dual variable in accordance with the solution of the Lagrangian dual problem.

5. A computer program product for constructing a plurality of updated tracks based upon associations of a plurality of measurements, each measurement being subject to a constraint, wherein the computer program product comprises a computer-readable storage medium having computer-readable program code means embodied in said medium, said computer-readable program code means comprising:
   first computer-readable program code means for relaxing each of the constraints by providing a dual variable for each constraint;
   second computer-readable program code means for constructing a Lagrangian dual function that at least partially depends upon the dual variable for each constraint and a cost associated with each potential association;
   third computer-readable program code means for determining a solution of a Lagrangian dual problem by determining an associated value for each dual variable based upon an evaluation of the Lagrangian dual function; and fourth computer-readable program code means for determining the associations that define the plurality of updated tracks based at least partially upon the value determined for the dual variable associated with each constraint.

6. A computer program product according to claim 5 wherein said third computer-readable program code means comprises computer-readable program code means for maximizing the Lagrangian dual function.

7. A computer program product according to claim 5 further comprising fifth computer-readable program code means for determining if a value of the Lagrangian dual function is acceptable prior to determining the associations that define the plurality of updated tracks, wherein said second and third computer-readable program code means repeat the construction of the Lagrangian dual function and the evaluation of the Lagrangian dual function if the prior value of the Lagrangian dual function is unacceptable.

8. A computer program product according to claim 5 wherein said first computer-readable program code means provides an initial value for the dual variable for each constraint, and wherein said third computer-readable program code means determines an updated value for each dual variable in accordance with the solution of the Lagrangian dual problem.

9. A method of selecting a plurality of updated tracks from among a plurality of candidate tracks having respective initial costs, wherein the candidate tracks are based upon associations between a plurality of measurements having respective dual variables, and wherein the method comprises:

determining an adjusted cost and an adjusted cost per non-zero measurement for each candidate track based upon the initial cost and the dual variable for each measurement that is associated to create the candidate track;

placing the candidate tracks in an order based upon the adjusted cost per non-zero measurement;

searching, by a depth first search, at least a portion of a search tree having a plurality of levels, said searching step comprises:

examining at least a portion of a level 1+1 dependent upon a level 1, wherein the level 1 comprises candidate tracks that are each: (1) feasible with respect to all candidate tracks lying in the unique path from the respective candidate track to a root node, and (2) later in the order of adjusted cost per non-zero measurement in which the candidate tracks have been placed than the candidate track of level 1 from which the respective candidate track descends, and wherein said examining comprises examining the candidate tracks at level 1+1 that descend from a respective track of level 1 in the order in which the candidate tracks have been placed; and repeating said examining step for at least portions of other levels of the search tree that descend from the level 1+1; and identifying the updated tracks based upon the search of at least a portion of the search tree including candidate tracks from the plurality of levels.

10. A method according to claim 9 wherein said searching step further comprises:

sequentially searching a plurality of nodes of the search tree; and identifying a completely feasible set of candidate tracks comprised of a plurality of nodes from different levels of the search tree that has the lowest cumulative adjusted cost from amongst those completely feasible sets of candidate tracks that were examined.

11. A method according to claim 10 wherein sequentially searching the plurality of nodes comprises:

determining a total number of feasible candidate tracks that have been skipped; and terminating the search of a respective branch if the total number of feasible candidate tracks that are skipped exceeds a threshold value.

12. A method according to claim 10 wherein said searching step further comprises:

maintaining a count of the lowest cumulative adjusted cost of the completely feasible sets of candidate tracks identified during the sequential search of the nodes of the search tree; and terminating the search of a respective branch if a sum of the cumulative adjusted cost of the current partially feasible set of candidate tracks and the lowest estimate of the cumulative adjusted cost associated with the measurements that remain unused is at least as great as the count of the lowest cumulative adjusted cost.

13. A method according to claim 9 wherein the candidate tracks of the level 1+1 that depend from a respective candidate track of the level 1 are arranged in order of increasing adjusted cost per non-zero measurement.

14. A computer program product for selecting a plurality of updated tracks from among a plurality of candidate tracks having respective initial costs, the candidate tracks being based upon associations between a plurality of measurements having respective dual variables, wherein the computer program product comprises a computer-readable storage medium having computer-readable program code means embodied in said medium, said computer-readable program code means comprising:

first computer-readable program code means for determining an adjusted cost and an adjusted cost per non-zero measurement for each candidate track based upon the initial cost and the dual variable for each measurement that is associated to create the candidate track;

second computer-readable program code means for placing the candidate tracks in an order based upon the adjusted cost per non-zero measurement;

third computer-readable program code means for searching, by a depth first search, at least a portion of a search tree having a plurality of levels, said second computer-readable program code means comprising:

computer-readable program code means for examining at least a portion of a level 1+1 dependent upon a level 1, wherein the level 1 comprises candidate tracks that are each: (1) feasible with respect to all candidate tracks lying in the unique path from the respective candidate track to a root node, and (2) later in the order of adjusted cost per non-zero measurement in which the candidate tracks have been placed than the candidate track of level 1 from which the respective candidate track descends, and wherein said computer-readable program code means for examining comprises examining the candidate tracks at level 1+1 that descend from a respective track of level 1 in the order in which the candidate tracks have been placed; and computer-readable program code means for repeating the examination for at least portions of other levels of the search tree that descend from the level 1+1; and fourth computer-readable program code means for identifying the updated tracks based upon the search of at least a portion of the search tree including candidate tracks from the plurality of levels.

15. A computer program product according to claim 14 wherein said third computer-readable program code means comprises:
   computer-readable program code means for sequentially searching a plurality of nodes of the search tree; and
   computer-readable program code means for identifying a completely feasible set of candidate tracks comprised of a plurality of nodes from different levels of the same tree that has the lowest cumulative adjusted cost from amongst those completely feasible sets of candidate tracks that were examined.

16. A computer program product according to claim 15 wherein said computer-readable program code means for sequentially searching the plurality of nodes comprises:
   computer-readable program code means for determining a total number of feasible candidate tracks that have been skipped; and
   computer-readable program code means for terminating the search of a respective branch if the total number of feasible candidate tracks that are skipped exceeds a threshold value.

17. A computer program product according to claim 15 wherein said third computer-readable program code means further comprises:
   computer-readable program code means for maintaining a count of the lowest cumulative adjusted cost of the sets of candidate tracks identified during the sequential search of the nodes of the search tree; and
   computer-readable program code means terminating the search of a respective branch if a sum of the cumulative adjusted cost of the current set of candidate tracks and the lowest estimate of the cumulative adjusted cost associated with the measurements that remain unused is at least as great as the count of the lowest cumulative adjusted cost.

18. A computer program product according to claim 15 wherein the candidate tracks of the level 1+1 that depend from a respective candidate track of the level 1 and arranged in order of increasing adjusted cost per non-zero measurement.

19. A method of selecting a plurality of updated tracks from among a plurality of candidate tracks having respective initial costs, wherein the candidate tracks are based upon associations between a plurality of measurements having respective dual variables, and wherein the method comprises:
   searching, by a depth first search, at least a portion of a search tree having a plurality of levels, wherein each level is comprised of at least one candidate track, said searching step comprises:
      sequentially searching along a unique path from a root node to a candidate track of level 1 of the search tree, wherein sequentially searching comprises: (1) determining a total number of feasible candidate tracks that have been skipped during the sequential search along the unique path, and (2) terminating the search along the unique path if the total number of feasible candidate tracks that are skipped exceeds a threshold value; and
      identifying the updated tracks based upon the search of at least a portion of the search tree including candidate tracks from the plurality of levels.

20. A method according to claim 19 wherein the candidate tracks of the level 1+1 that depend from a respective candidate track of the level 1 are arranged in order of increasing adjusted cost per non-zero measurement.

21. A computer program product for selecting a plurality of updated tracks from among a plurality of candidate tracks having respective initial costs, the candidate tracks being based upon associations between a plurality of measurements having respective dual variables, wherein the computer program product comprises a computer-readable storage medium having computer-readable program code means embodied in said medium, said computer-readable program code means comprising:
   first computer-readable program code means for searching, by a depth first search, at least a portion of a search tree having a plurality of levels, wherein each level is comprised of at least one candidate track, and wherein said first computer-readable program code means comprising:
      computer-readable program code means for sequentially searching along a unique path from a root node to a candidate track of level 1 of the search tree, wherein sequentially searching comprises: (1) determining a total number of feasible candidate tracks that have been skipped during the sequential search along the unique path, and (2) terminating the search along the unique path if the total number of feasible candidate tracks that are skipped exceeds a threshold value; and
   second computer-readable program code means for identifying the updated tracks based upon the search of at least a portion of the search tree including candidate tracks from the plurality of levels.

22. A computer program product according to claim 21 wherein the candidate tracks of the level 1+1 that depend from a respective candidate track of level 1 are arranged in order of increasing adjusted cost per non-zero measurement.

23. A method of constructing a plurality of updated tracks based upon associations of a plurality of measurements, wherein the measurements are subject to a plurality of constraints, and wherein the method comprises:
   constructing an approximation of a Lagrangian dual function based at least in part upon dual variables associated with the measurements and also in part upon subgradients of the Lagrangian dual function;
   initializing the dual variables and providing at least some of the subgradients based upon values of corresponding dual variables and subgradients, respectively, determined during a solution of a prior Lagrangian dual problem;
   maximizing the Lagrangian dual function; and
   determining the associations that define the plurality of updated tracks based at least partially upon the maximized Lagrangian dual function.

24. A method according to claim 23 further comprising determining if a solution of a Lagrangian dual problem based upon the maximized Lagrangian dual function is acceptable prior to determining the associations that define the plurality of updated tracks.

25. A method according to claim 24 further comprising:
   updating the dual variables and the subgradients based at least in part upon a current value of the Lagrangian dual function; and
   repeating an evaluation on the Lagrangian dual function if the prior value of the Lagrangian dual function is unacceptable.

26. A computer program product for constructing a plurality of updated tracks based upon associations of a plurality of measurements, each measurement being subject to a constraint, wherein the computer program product comprises a computer-readable storage medium having computer-readable program code means embodied in said medium, said computer-readable program code means comprising:

first computer-readable program code means for constructing an approximation of a Lagrangian dual function based at least in part upon dual variables associated with the measurements and also in part upon subgradients of the Lagrangian dual function;

second computer-readable program code means for initializing the dual variables and providing at least some of the subgradients based upon values of corresponding dual variables and subgradients, respectively, determined during a solution of a prior Lagrangian dual problem;

third computer-readable program code means for maximizing the Lagrangian dual function; and fourth computer-readable program code means for determining the associations that define the plurality of updated tracks based at least partially upon the maximized Lagrangian dual function.

27. A computer program product according to claim 26 further comprising computer-readable program code means for determining if a solution of a Lagrangian dual problem based on the maximized Lagrangian dual function is acceptable prior to determining the associations that define the plurality of updated tracks.

28. A computer program product according to claim 27 further comprising computer-readable program code means for updating the dual variables and the subgradients based at least in part upon a current value of the Lagrangian dual function, wherein said third computer-readable program code means repeats an evaluation of the Lagrangian dual function if the prior value of the Lagrangian dual function is unacceptable.

29. A method of constructing a plurality of updated tracks based upon associations of a plurality of measurements in a parallel computing architecture having a plurality of processors, the method comprising:

decomposing data representative of the plurality of measurements into a plurality of subproblems having respective sizes;

evaluating the sizes of the subproblems to determine if the subproblems are capable of being assigned to the plurality of processors in a balanced manner;

assigning the plurality of subproblems to respective ones of the plurality of processors; and executing the plurality of subproblems in parallel on the respective processors to determine the associations of the plurality of measurements of each subproblem in order to define the plurality of updated tracks, said executing step comprising dividing at least one subproblem into parts and assigning at least one part of the divided subproblem to a different processor if said evaluating step determines that the subproblems are otherwise incapable of being assigned to the plurality of processors in a balanced manner.

30. A method according to claim 29 wherein executing a subproblem on a respective processor comprises:

constructing a Lagrangian dual function representative of the respective subproblem; and maximizing the Lagrangian dual function.

31. A method according to claim 30 wherein each potential association has an initial cost, wherein constructing the Lagrangian dual function comprises determining a dual variable for each measurement and determining an adjusted cost for each potential association based upon the initial cost and the dual variable for each measurement that is associated to create the potential association, and wherein said assigning step comprises assigning the determination of the adjusted cost to a different processor.

32. A method according to claim 29 wherein said evaluating step comprises evaluating at least one of the number of associations and the number of measurements included within the subproblem to determine the size of the subproblem.

33. A method according to claim 29 wherein said evaluating step comprises:

determining a maximum variation between the cumulative size of the subproblems assigned to the respective processors; and determining that the subproblems are capable of being assigned to the plurality of processors in a balanced manner if the maximum variation is less than a predetermined threshold.

34. A computer program product for constructing a plurality of updated tracks based upon associations of a plurality of measurements in a parallel computing architecture having a plurality of processors, wherein the computer program product comprises a computer-readable storage medium having computer-readable program code means embodied in said medium, said computer-readable program code means comprising:

first computer-readable program code means for decomposing data representative of the plurality of measurements into a plurality of subproblems having respective sizes;

second computer-readable program code means for evaluating the sizes of the subproblems to determine if the subproblems are capable of being assigned to the plurality of processors in a balanced manner;

third computer-readable program code means for assigning the plurality of subproblems to respective ones of the plurality of processors; and fourth computer-readable program code means for executing the plurality of subproblems in parallel on the respective processors to determine the associations of the plurality of measurements of each subproblem in order to define the plurality of updated tracks, said fourth computer-readable program code means for comprising computer-readable program code means for dividing at least one subproblem into parts and assigning at least one part of the divided subproblem to a different processor if said second computer-readable program code means for determines that the subproblems are otherwise incapable of being assigned to the plurality of processors in a balanced manner.

35. A computer program product according to claim 34 wherein said fourth computer-readable program code means comprises:

computer-readable program code means for constructing a Lagrangian dual function representative of a respective subproblem; and computer-readable program code means for maximizing the Lagrangian dual function.

36. A computer program product according to claim 35 wherein each potential association has an initial cost, wherein said computer-readable program code means for constructing the Lagrangian dual function comprises computer-readable program code means for determining a dual variable for each measurement and determining an adjusted cost for each potential association based upon the initial cost and the dual variable for each measurement that is associated to create the potential association, and wherein said computer-readable program code means for assigning at least one part of the divided subproblem to a different processor comprises computer-readable program code means for assigning the determination of the adjusted cost to a different processor.

37. A computer program product according to claim 34 wherein said second computer-readable program code means comprises computer-readable program code means for evaluating at least one of the number of associations and the number of measurements included within the subproblem to determine the size of the subproblem.

38. A computer program product according to claim 34 wherein said second computer-readable program code means comprises:

computer-readable program code means for determining a maximum variation between the cumulative size of the subproblems assigned to the respective processors; and computer-readable program code means for determining that the subproblems are capable of being assigned to the plurality of processors in a balanced manner if the maximum variation is less than a predetermined threshold.

39. A system for constructing a plurality of updated tracks based upon associations of a plurality of measurements of a plurality of objects, wherein the measurements are subject to a plurality of constraints, and wherein the system comprises:

at least one sensor for obtaining the measurements of the plurality of objects;

a processing architecture, responsive to said at least one sensor, comprising:

means for relaxing each of the constraints by providing a dual variable for each constraint;

means for constructing a Lagrangian dual function that at least partially depends upon the dual variable for each constraint and a cost associated with each potential association;

means for determining a solution of a Lagrangian dual problem by determining an associated value for each dual variable based upon an evaluation of the Lagrangian dual function; and means for determining the associations that define the plurality of updated tracks based at least partially upon the value determined for the dual variable associated with each constraint.

40. A system according to claim 39 wherein said means for determining the solution of the Lagrangian dual function comprises means for maximizing the Lagrangian dual function.

41. A system according to claim 39 further comprising means for determining if a value of the Lagrangian dual function is acceptable prior to determining the associations that define the plurality of updated tracks such that the construction of the Lagrangian dual function and the evaluation of the Lagrangian dual function are repeated if the prior value of the Lagrangian dual function is unacceptable.

42. A system according to claim 39 wherein means for relaxing each of the constraints comprises means for providing an initial value for the dual variable for each constraint, and wherein said means for determining the solution of the Lagrangian dual problem comprises means for determining an updated value for each dual variable in accordance with the solution of the Lagrangian dual problem.

43. A system for solving a combinatorial optimization problem to define a plurality of associations of measurements taken of a plurality of objects, wherein the measurements are subject to a plurality of constraints, and wherein the system comprises:

means for relaxing each of the constraints by providing a dual variable for each constraint;

means for constructing a Lagrangian dual function that at least partially depends upon the dual variable for each constraint and a cost associated with each potential association;

means for determining a solution of a Lagrangian dual problem by determining an associated value for each dual variable based upon an evaluation of the Lagrangian dual function; and means for determining the associations of measurements-taken of the plurality of objects based at least partially upon the value determined for the dual variable associated with each constraint.

44. A system according to claim 43 wherein said means for determining the solution of the Lagrangian dual function comprises means for maximizing the Lagrangian dual function.

45. A system according to claim 43 further comprising means for determining if a value of the Lagrangian dual function is acceptable prior to determining the associations of measurements taken of the plurality of objects such that the construction of the Lagrangian dual function and the evaluation of the Lagrangian dual-function are repeated if the prior value of the Lagrangian dual function is unacceptable.

46. A system according to claim 43 wherein means for relaxing each of the constraints comprises means for providing an initial value for the dual variable for each constraint, and wherein said means for determining the solution of the Lagrangian dual problem comprises means for determining an updated value for each dual variable in accordance with the solution of the Lagrangian dual problem.

47. In a tracking system having at least one sensor for providing scan data from a plurality of scans:

a set partitioning problem solver resident on a processor in communication with the sensor for operating on the scan data to define associations in the data from scan to scan in a sliding window architecture using a Lagrangian Relaxation combinatorial optimization approximation, including relaxation of all constraints in the Lagrangian Relaxation approximation.

48. A tracking system according to claim 47 wherein the solver solves set partitioning problems.

49. A tracking system according to claim 47 wherein the processor includes parallel processors and the solver distributes its workload to the processors according to a combination of both course grain and fine grain techniques.

50. The tracking system according to claim 47 wherein said sensor provides data in an asynchronous manner.

* * * * *